United States Patent
Wolbers et al.

(10) Patent No.: US 8,123,437 B2
(45) Date of Patent: Feb. 28, 2012

(54) PIPELINE ASSEMBLY COMPRISING AN ANCHORING DEVICE

(75) Inventors: Dirk Rients Wolbers, The Woodlands, TX (US); Ton Coppens, Oegstgeest (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 569 days.

(21) Appl. No.: 12/089,437

(22) PCT Filed: Oct. 9, 2006

(86) PCT No.: PCT/NL2006/000507
§ 371 (c)(1),
(2), (4) Date: May 5, 2008

(87) PCT Pub. No.: WO2007/043862
PCT Pub. Date: Apr. 19, 2007

(65) Prior Publication Data
US 2008/0253842 A1 Oct. 16, 2008

Related U.S. Application Data

(63) Continuation-in-part of application No. 11/245,477, filed on Oct. 7, 2005, now abandoned.

(51) Int. Cl.
*F16L 1/12* (2006.01)
(52) U.S. Cl. ............... 405/172; 405/169; 405/158
(58) Field of Classification Search .......... 405/169, 405/171, 172, 173, 184.4, 158, 166, 168.1; 166/343, 351, 339
See application file for complete search history.

(56) References Cited

U.S. PATENT DOCUMENTS
3,834,432 A 9/1974 Lilly, Jr. et al.
(Continued)

FOREIGN PATENT DOCUMENTS
EP 0459649 A1 12/1991
(Continued)

OTHER PUBLICATIONS

Bhat et al.; Pragmatic Solutions to Touch-Down Zone Fatigue Challenges in Steel Catenary Risers; Offshore Technology Conference: Houston, Texas, May 3-6, 2004, pp. 1-9; OTC 16627.
(Continued)

*Primary Examiner* — John Kreck
*Assistant Examiner* — Sean Andrish
(74) *Attorney, Agent, or Firm* — Hoffman & Baron, LLP

(57) ABSTRACT

The invention relates to a pipeline assembly and a method of installing a pipeline assembly, wherein the pipeline extends at least in part on a seabed and curves upwardly from the seabed along a curved section thereof, the pipeline extending toward a delivery end provided at the water surface, wherein a connecting device connects the pipeline at a coupling point to an anchoring device at the seabed for preventing the coupling point from moving upward.

The invention further relates to a pipeline device comprising at least two pipeline assemblies which are interconnected at a substantial distance from the seabed.

19 Claims, 26 Drawing Sheets

U.S. PATENT DOCUMENTS

| | | | |
|---|---|---|---|
| 4,182,584 A | 1/1980 | Panicker et al. | |
| 4,262,380 A | 4/1981 | Foolen | |
| 4,400,109 A | 8/1983 | Gentry et al. | |
| 4,490,121 A | 12/1984 | Coppens et al. | |
| 4,547,163 A | 10/1985 | Langpaap et al. | |
| 4,645,467 A | 2/1987 | Pollack | |
| 4,648,848 A | 3/1987 | Busch | |
| 4,673,313 A | 6/1987 | Baugh et al. | |
| 4,735,267 A | 4/1988 | Stevens | |
| 4,906,137 A * | 3/1990 | Maloberti et al. | 405/224.3 |
| 5,041,038 A | 8/1991 | Poldervaart et al. | |
| 5,044,297 A | 9/1991 | de Baan et al. | |
| 5,439,321 A | 8/1995 | Hunter | |
| 5,480,264 A | 1/1996 | Hunter | |
| 5,639,187 A | 6/1997 | Mungall et al. | |
| 5,657,823 A | 8/1997 | Kogure et al. | |
| 5,823,131 A | 10/1998 | Boatman et al. | |
| 5,957,074 A | 9/1999 | de Baan et al. | |
| 6,082,391 A | 7/2000 | Thiebaud et al. | |
| 6,109,830 A * | 8/2000 | de Baan | 405/170 |
| 6,176,193 B1 | 1/2001 | Whitby et al. | |
| 6,200,180 B1 | 3/2001 | Hooper | |
| 6,263,971 B1 | 7/2001 | Giannesini | |
| 6,321,844 B1 | 11/2001 | Thiebaud et al. | |
| 6,457,536 B1 | 10/2002 | Bye et al. | |
| 6,461,083 B1 | 10/2002 | Pionetti et al. | |
| 2002/0060077 A1 | 5/2002 | Biolley | |
| 2002/0177375 A1 | 11/2002 | Cottrell et al. | |
| 2003/0017010 A1 | 1/2003 | Heyl et al. | |
| 2003/0084960 A1 | 5/2003 | Fontenot | |
| 2004/0156684 A1 | 8/2004 | Pionetti | |
| 2005/0158126 A1 | 7/2005 | Luppi | |

FOREIGN PATENT DOCUMENTS

| | | |
|---|---|---|
| EP | 0831023 A1 | 3/1998 |
| EP | 1172518 A1 | 6/2000 |
| FR | 2656274 | 6/1991 |
| FR | 2809136 | 11/2001 |
| FR | 2839110 | 10/2003 |
| GB | 2257405 A | 1/1993 |
| GB | 2311503 A | 1/1997 |
| GB | 2306608 A | 5/1997 |
| GB | 2410756 A | 8/2005 |
| WO | 9520717 | 8/1995 |
| WO | 9722780 | 6/1997 |
| WO | 9725242 | 7/1997 |
| WO | 0005129 | 2/2000 |
| WO | 0008262 | 2/2000 |
| WO | 0008282 | 2/2000 |
| WO | 0031372 | 6/2000 |
| WO | 0114687 A1 | 3/2001 |
| WO | 0210010 A1 | 2/2002 |
| WO | 0242599 A1 | 5/2002 |
| WO | 02066786 A1 | 8/2002 |
| WO | 02103153 A1 | 12/2002 |
| WO | 03012327 A1 | 2/2003 |
| WO | 03031765 A1 | 4/2003 |
| WO | 03097990 A1 | 11/2003 |
| WO | 2004035375 A1 | 4/2004 |

OTHER PUBLICATIONS

Laver et al.; Steel Catenary Riser Touchdown Point Vertical Interaction Models; Offshore Technology Conference, Houston, Texas, May 3-6, 2004, pp. 1-9, OTC16628.

Clausen et al; The Hybrid Riser Bundle: An Alternative to Hybrid Riser Towers at Reduced Cost and Risk; Riser Technology, Internet: Flowlines and Pipelines: Cost-effective Oil Export Flow Line for Fields in Deepwa . . . , pagina 1 van 13; Sep. 28, 2005; 13 pages.

BSW Design & Engineering; Ballgrab Pipeline Tools; www.bswltd.com; 2 pages.

* cited by examiner

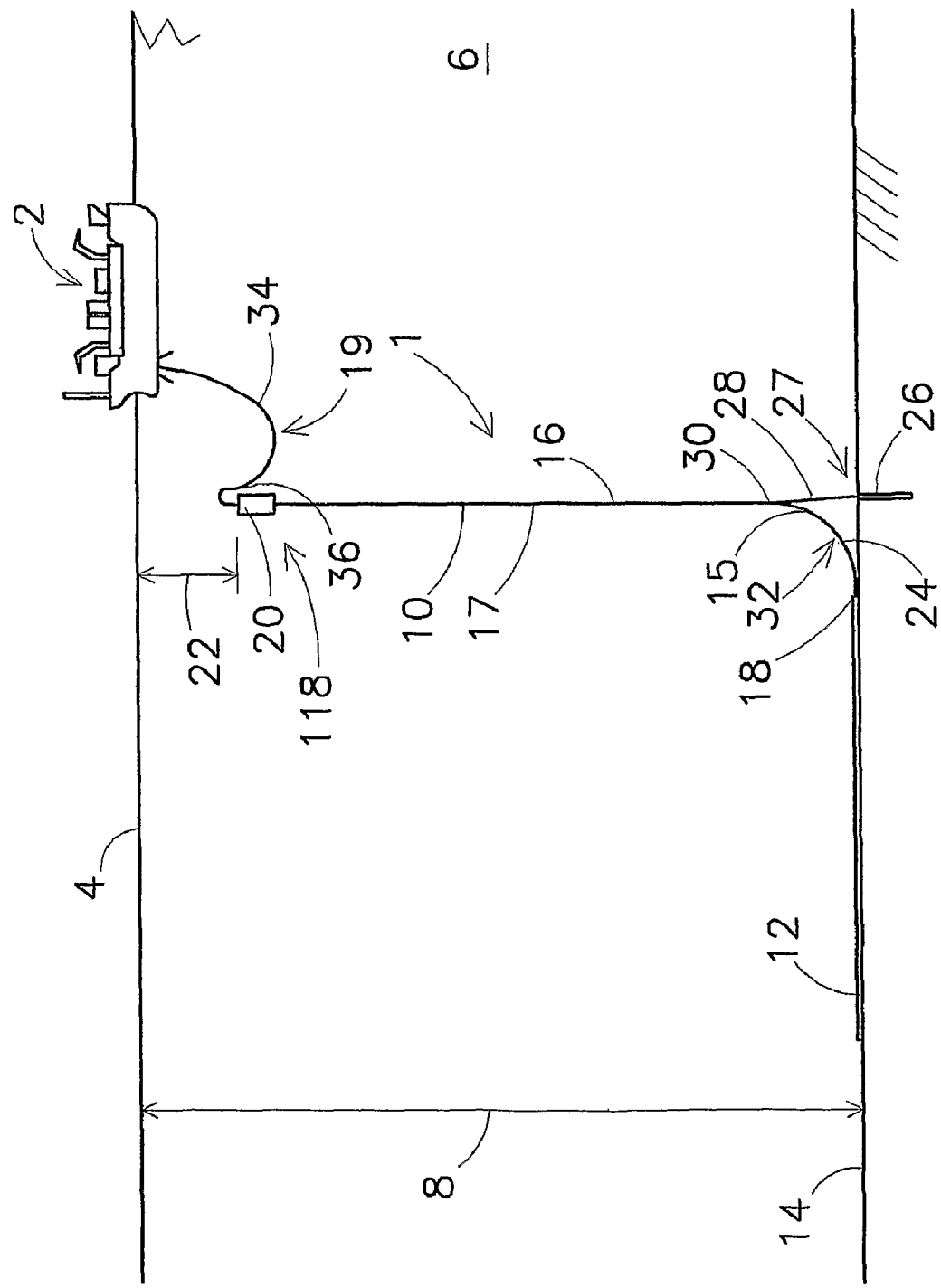

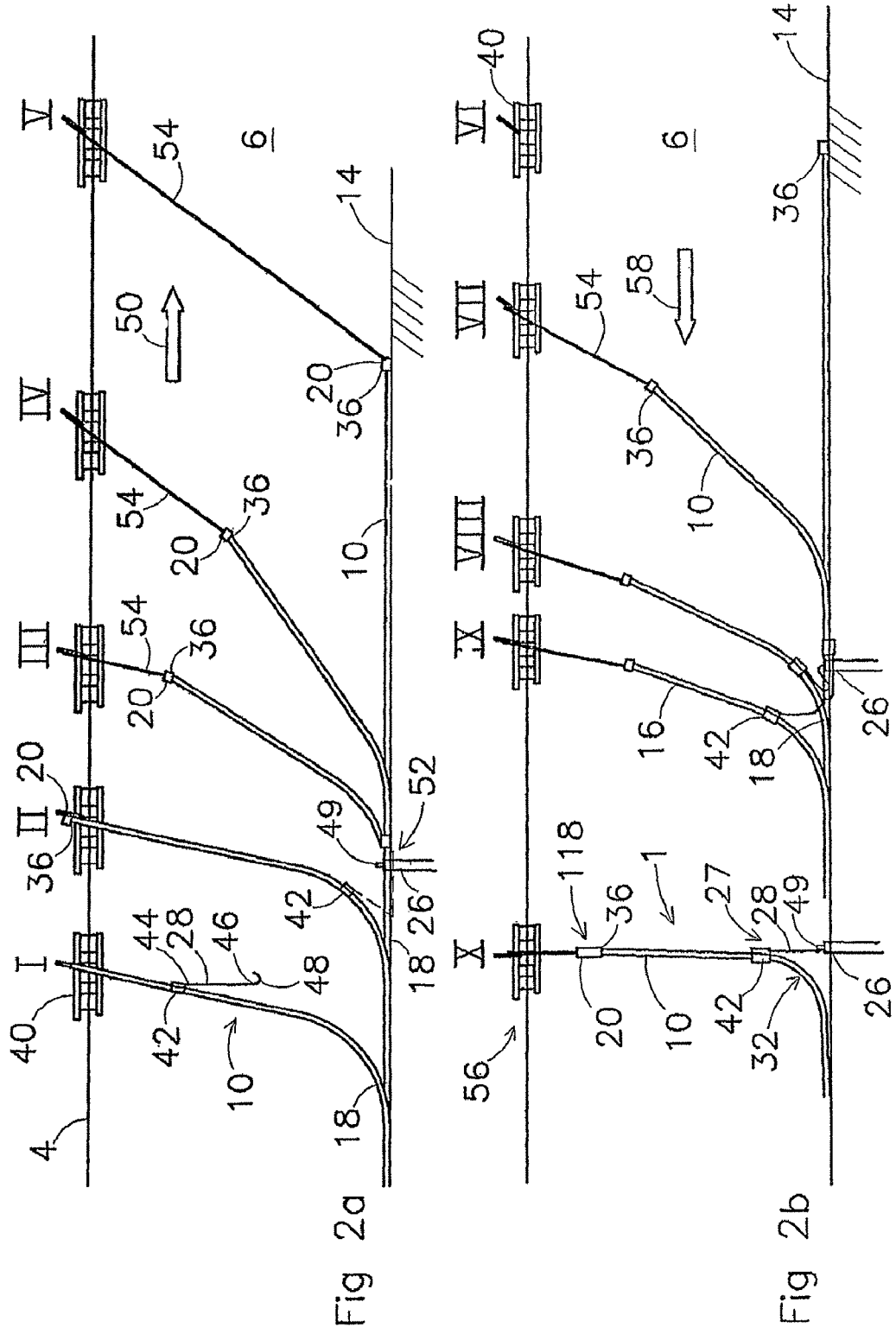

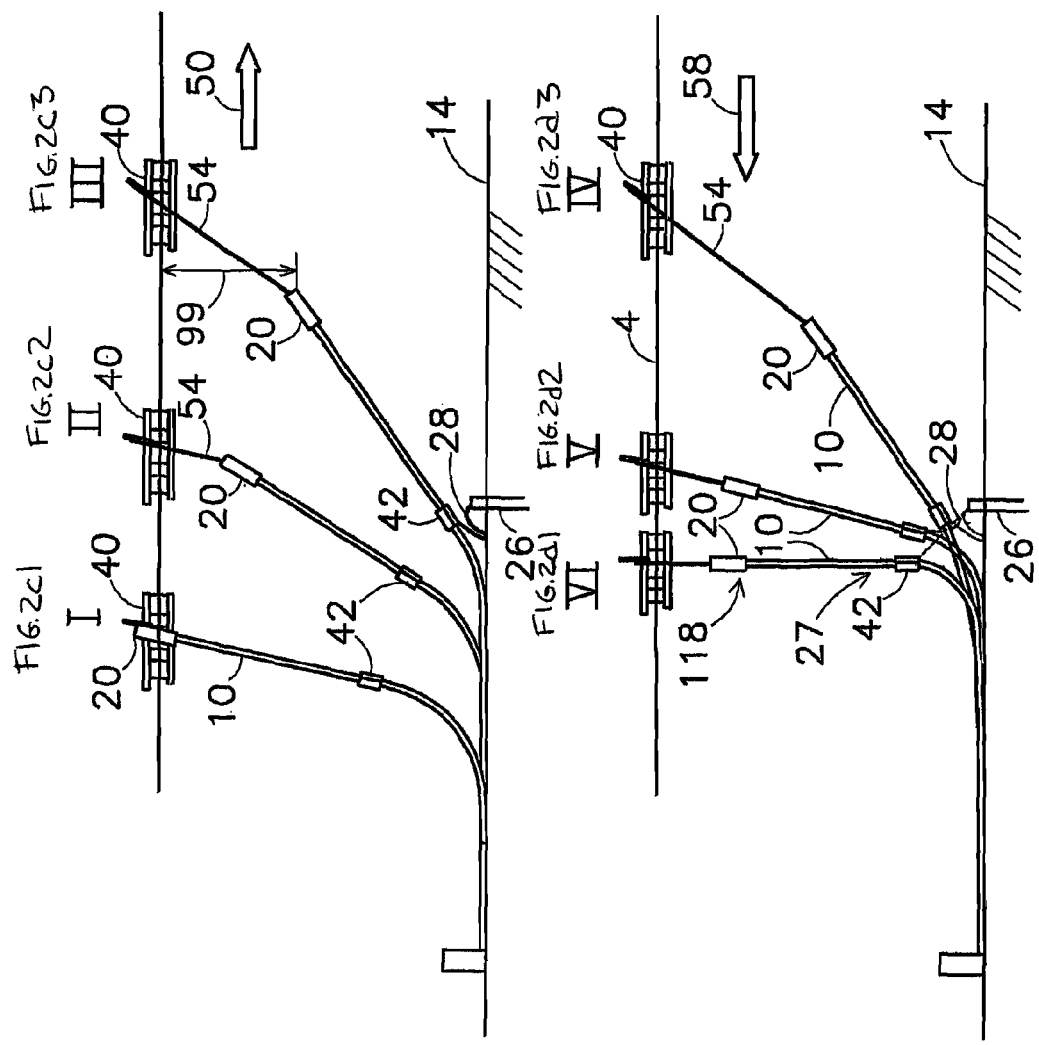

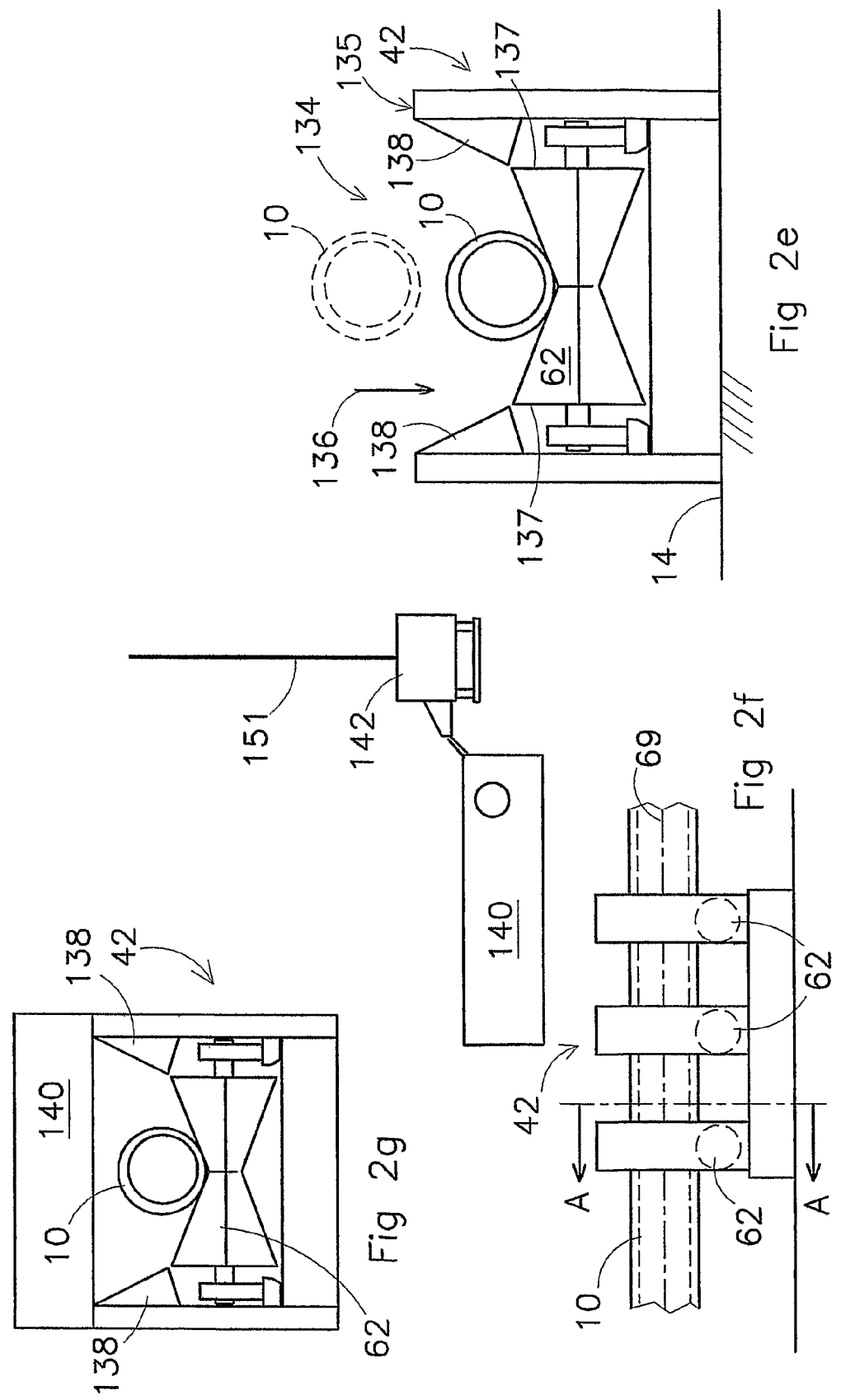

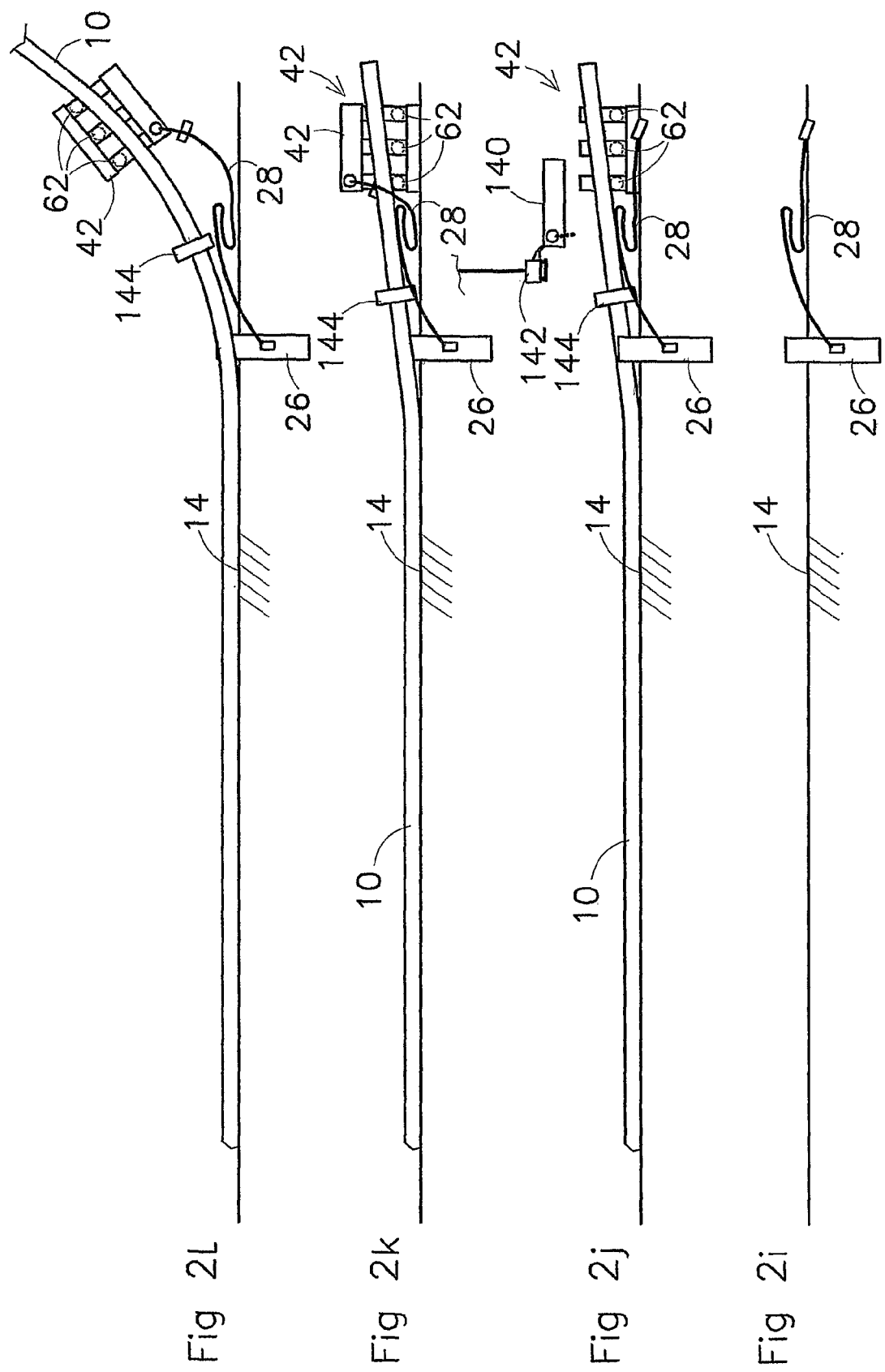

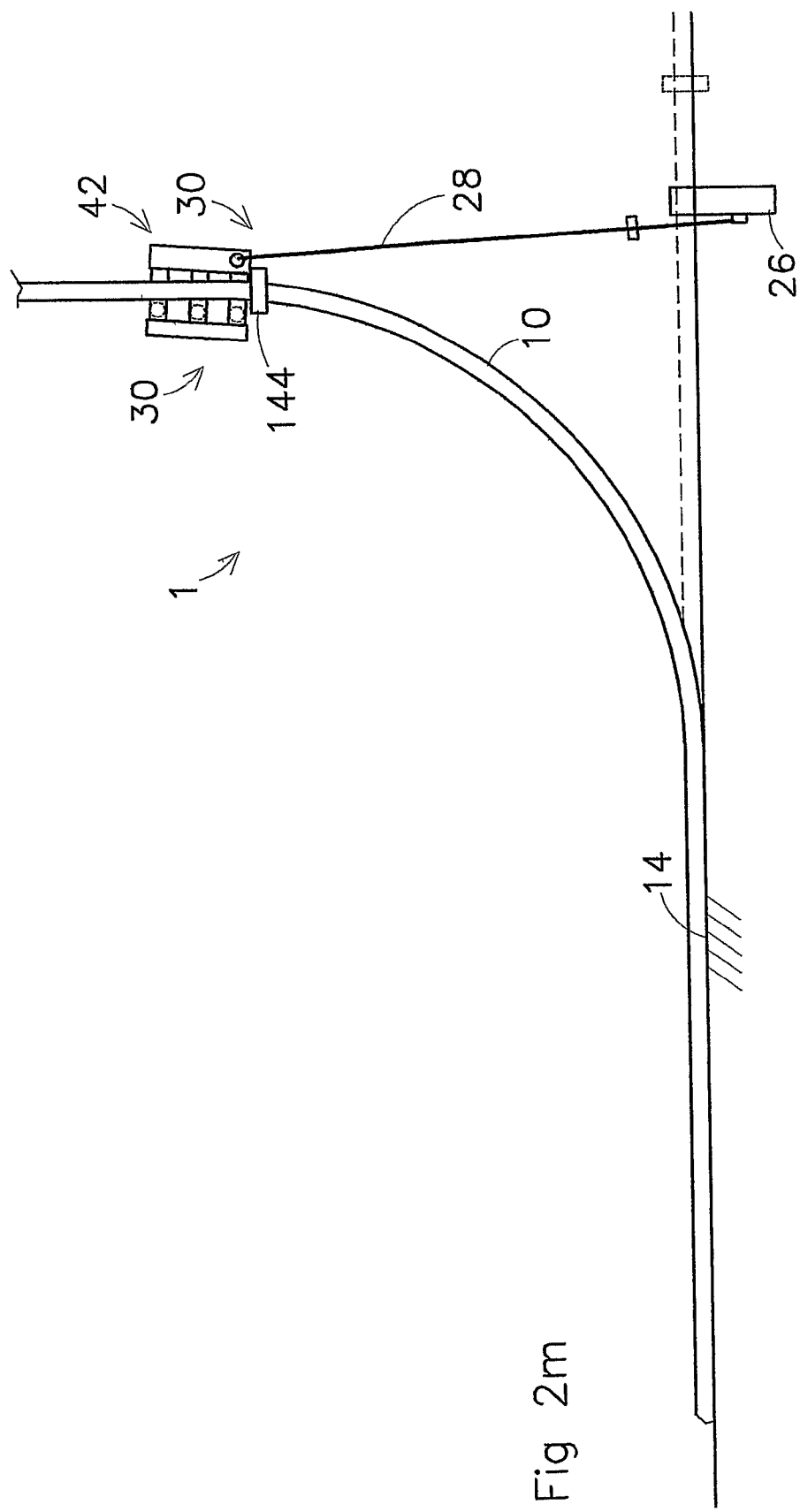

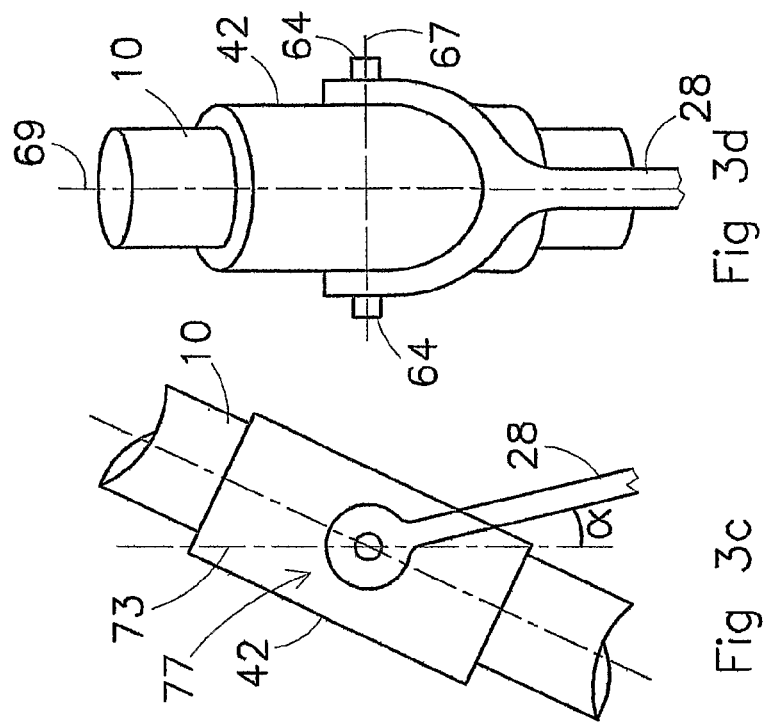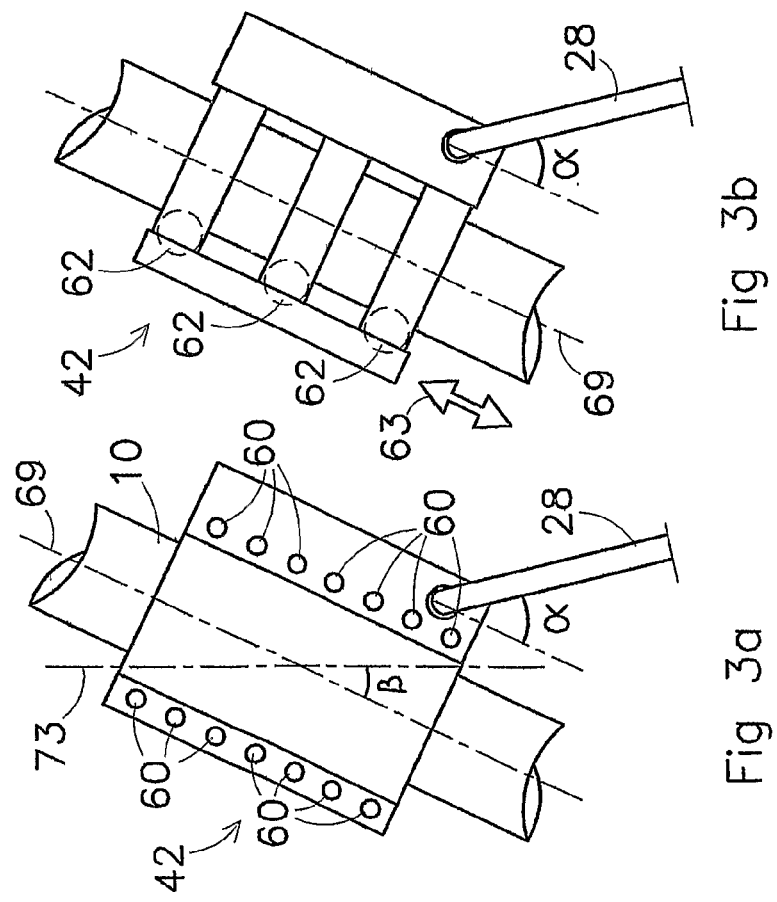

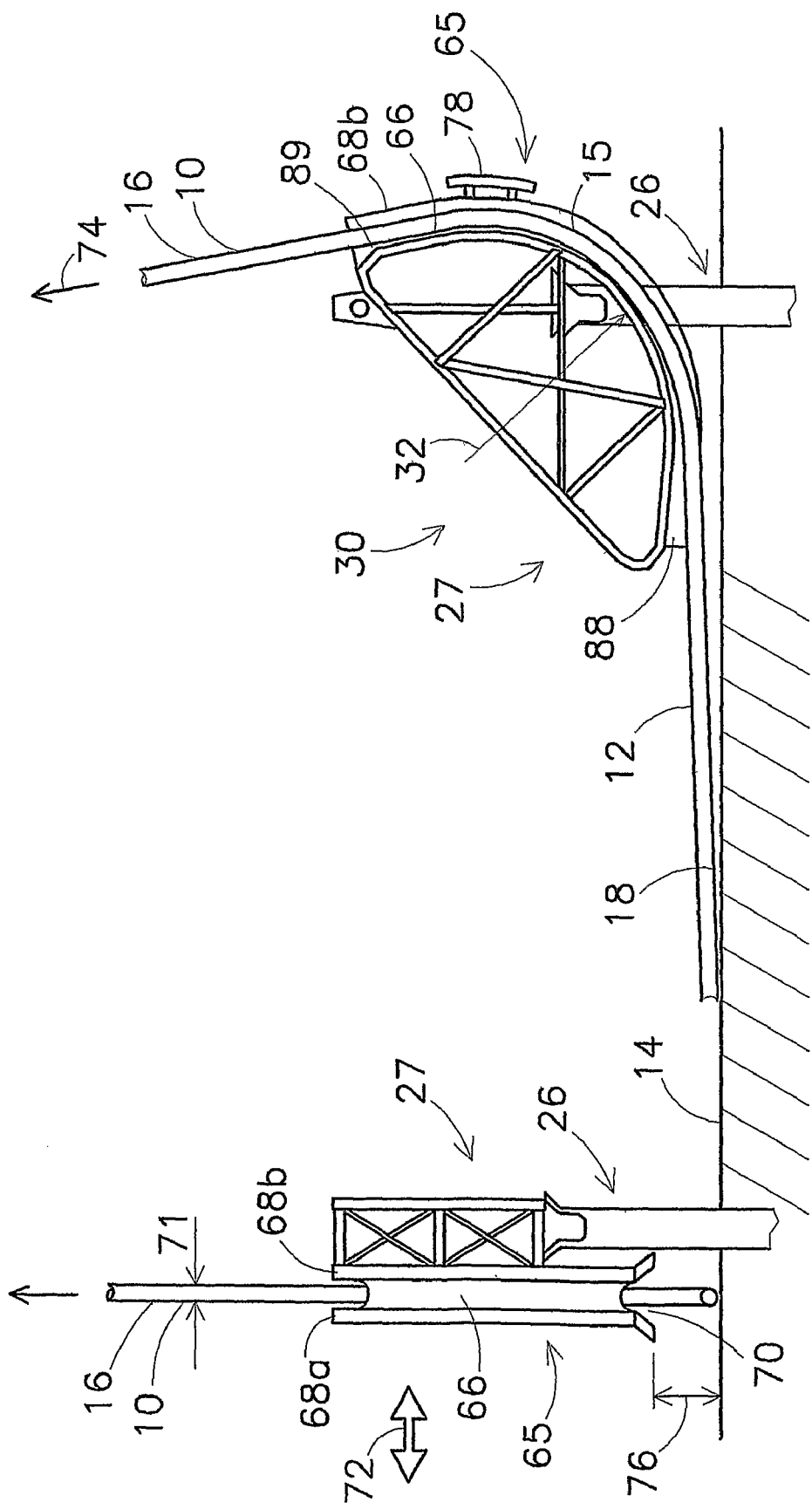

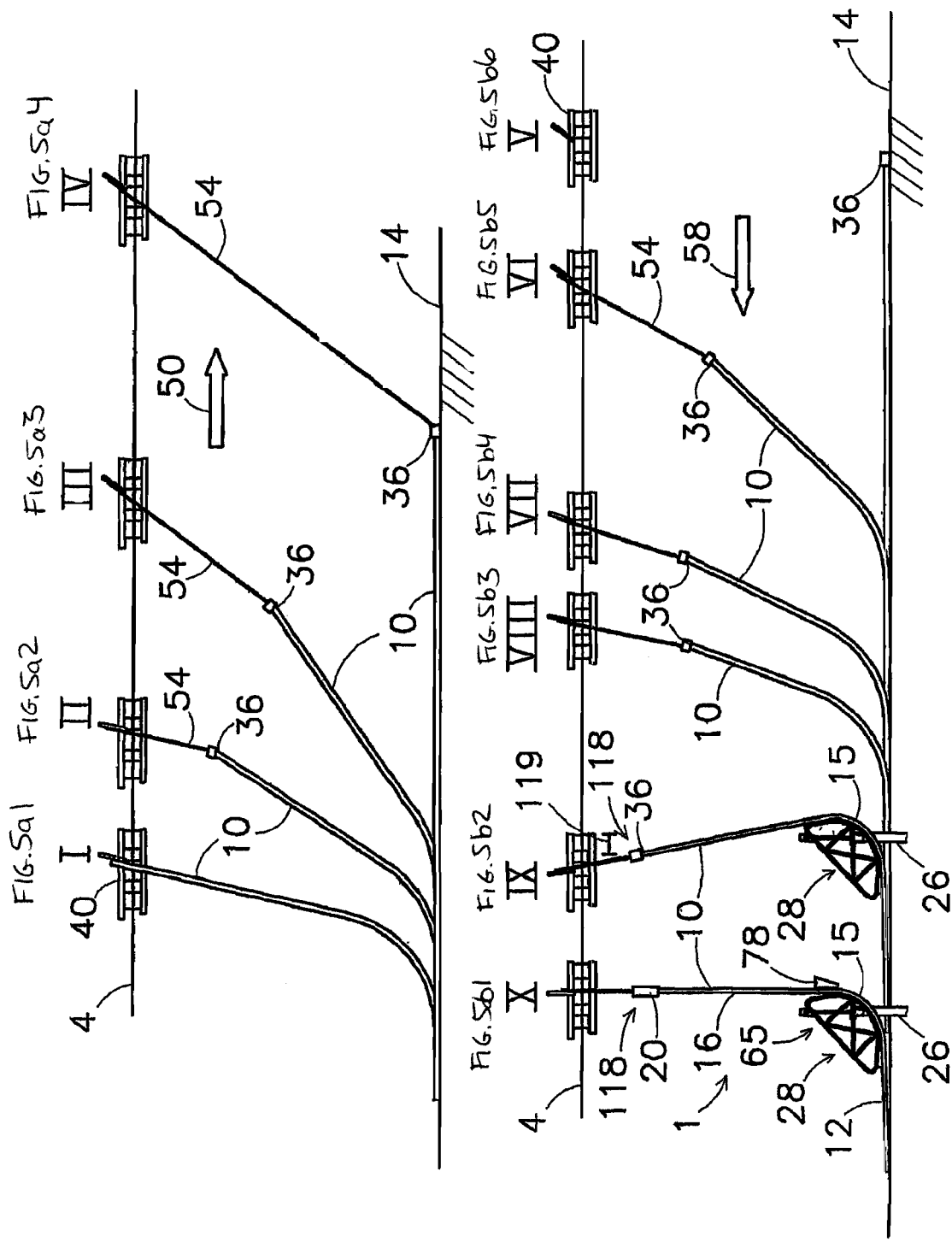

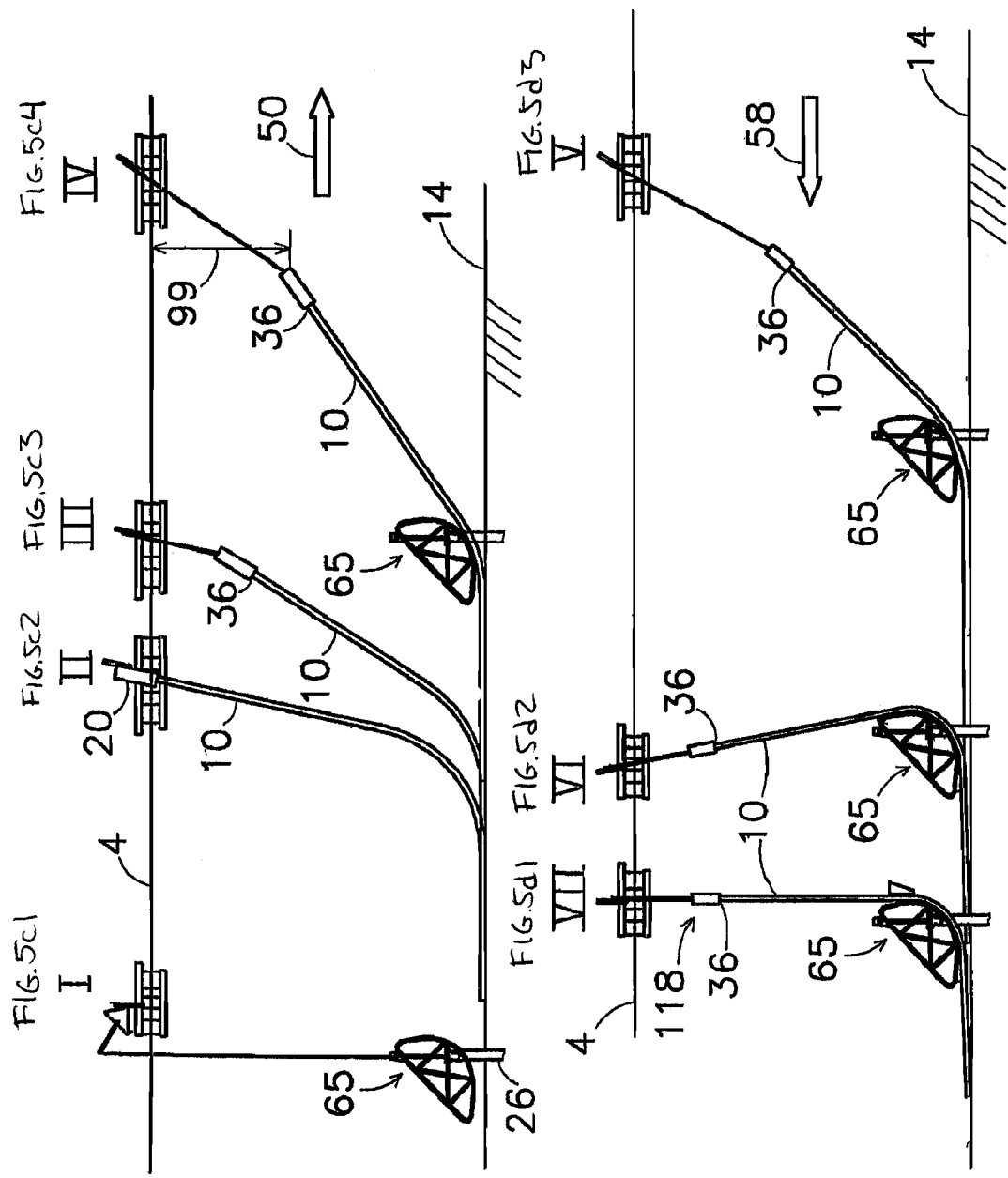

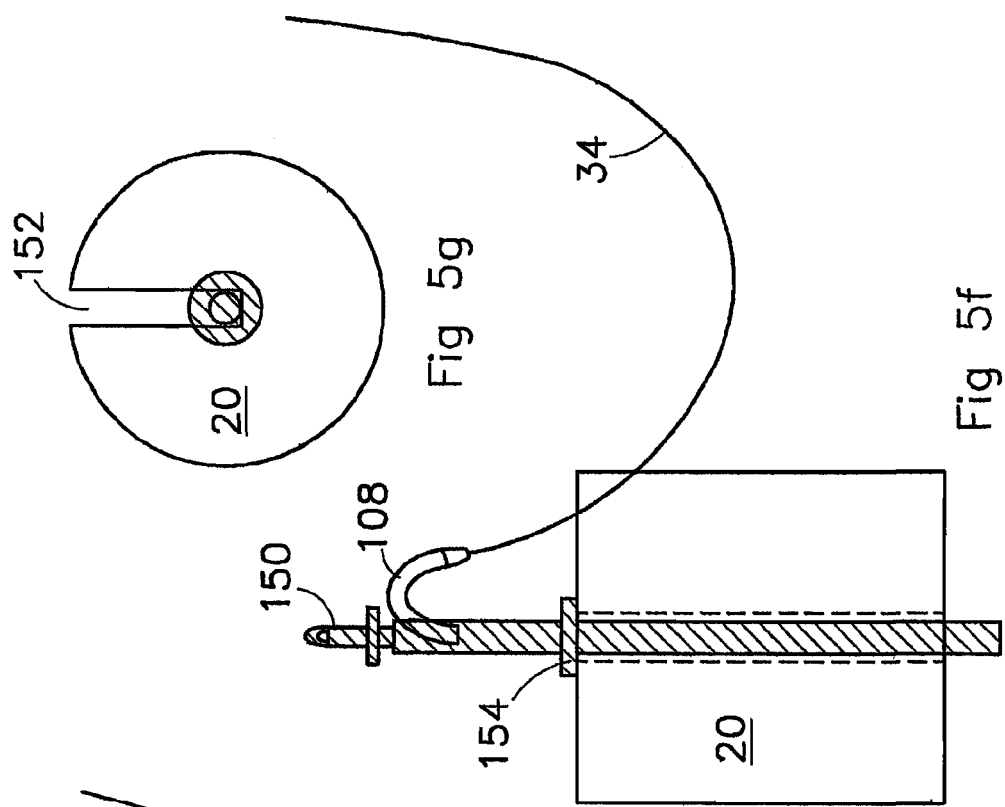
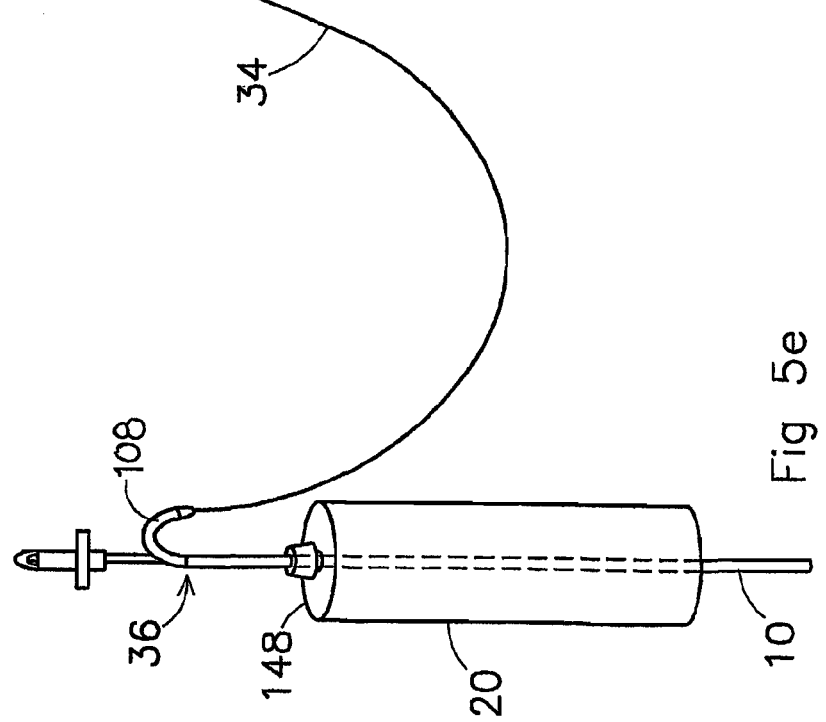

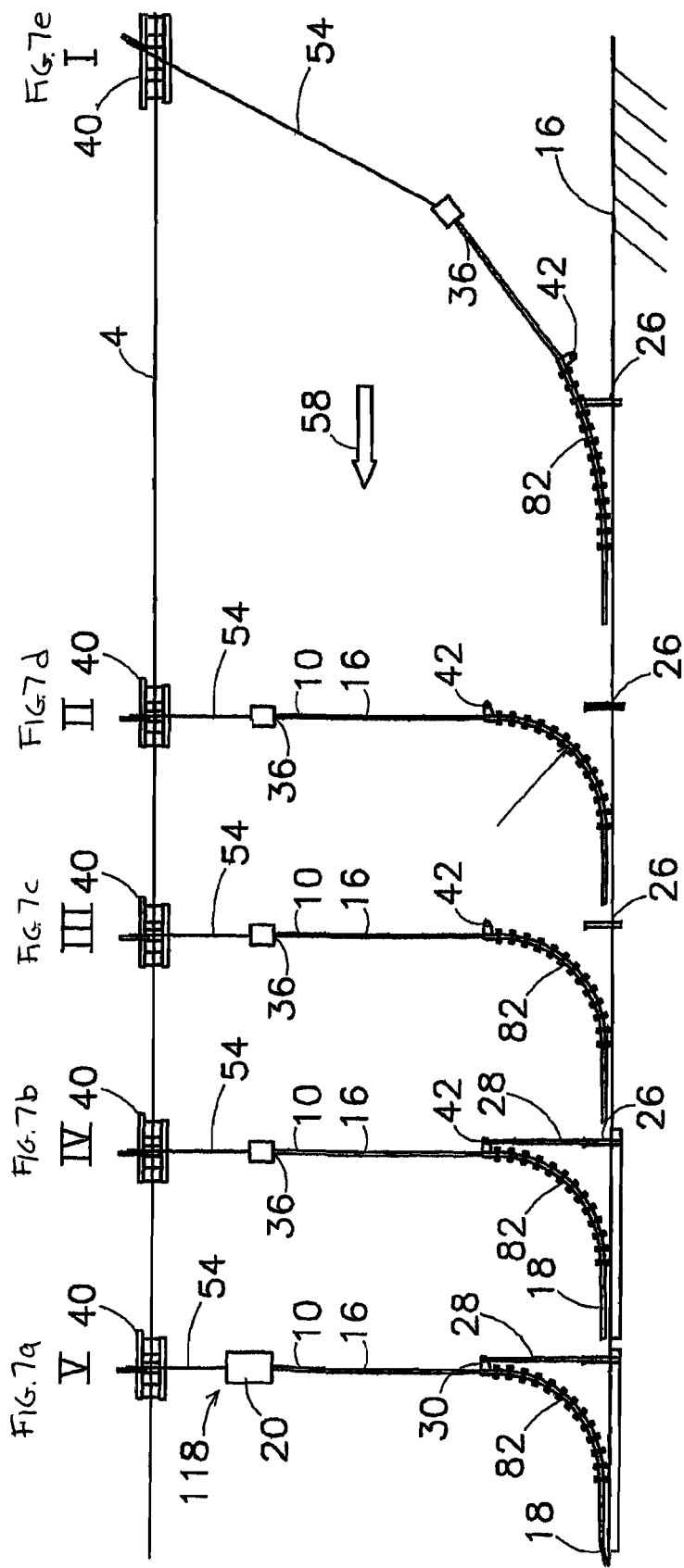

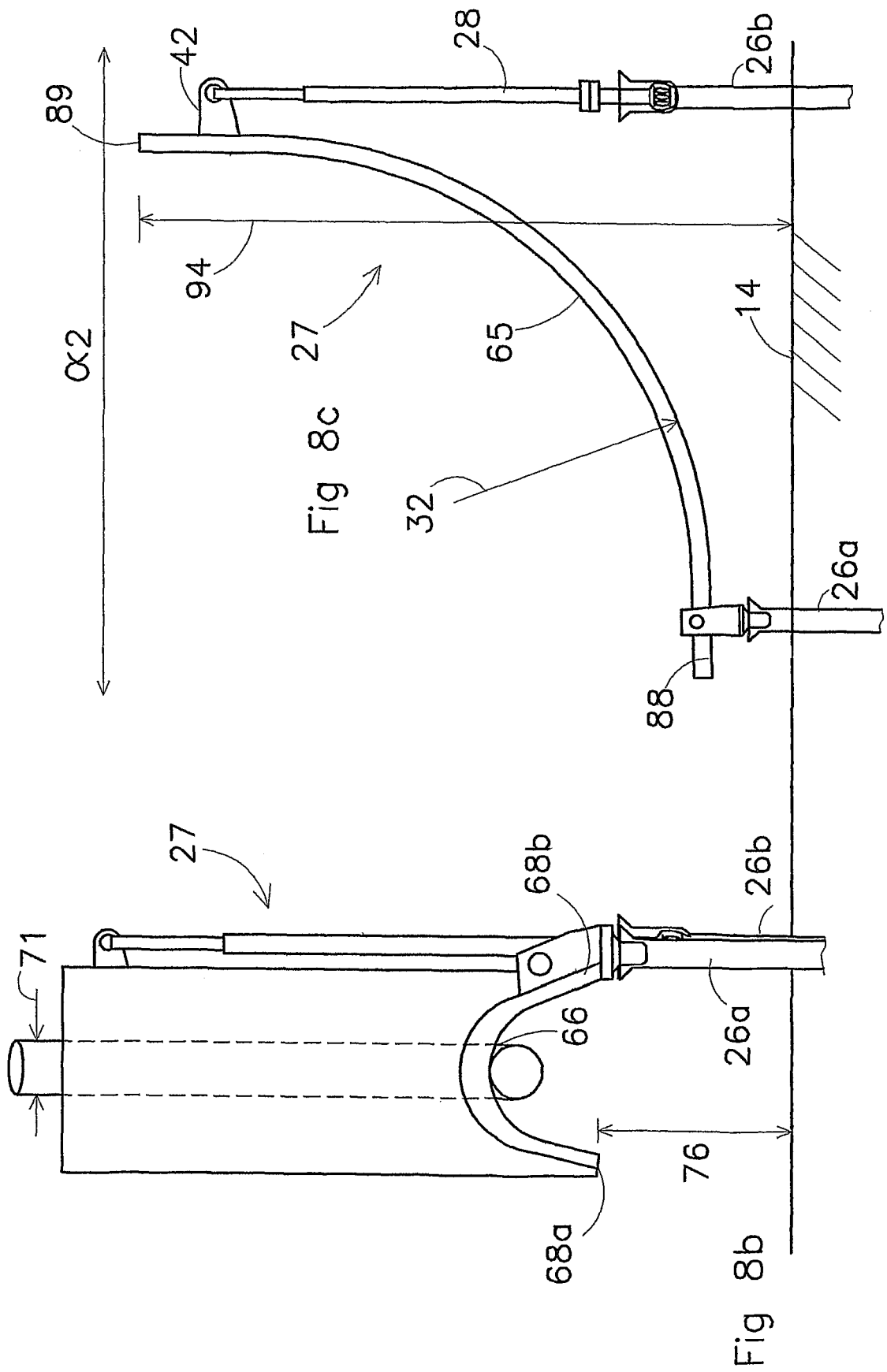

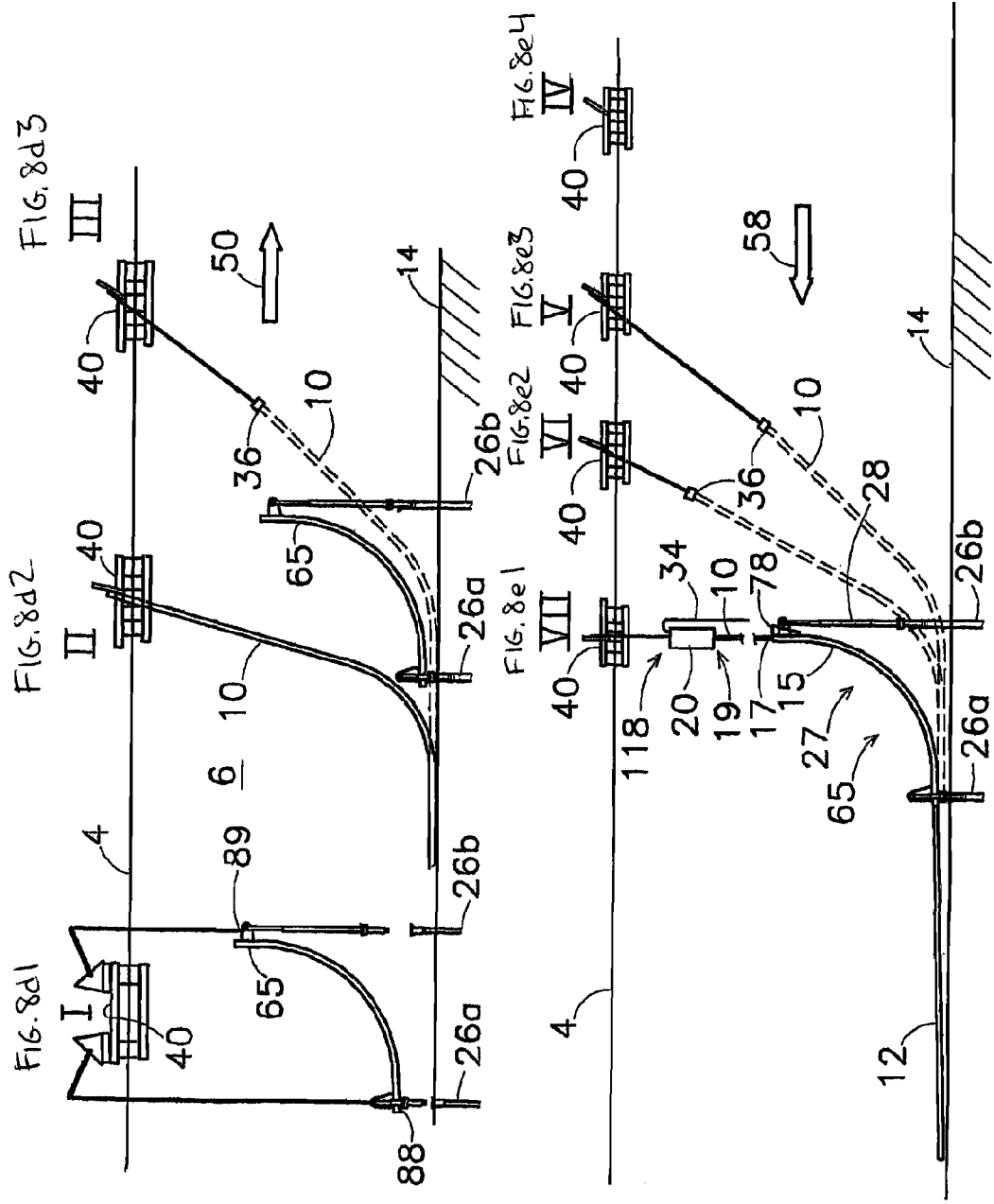

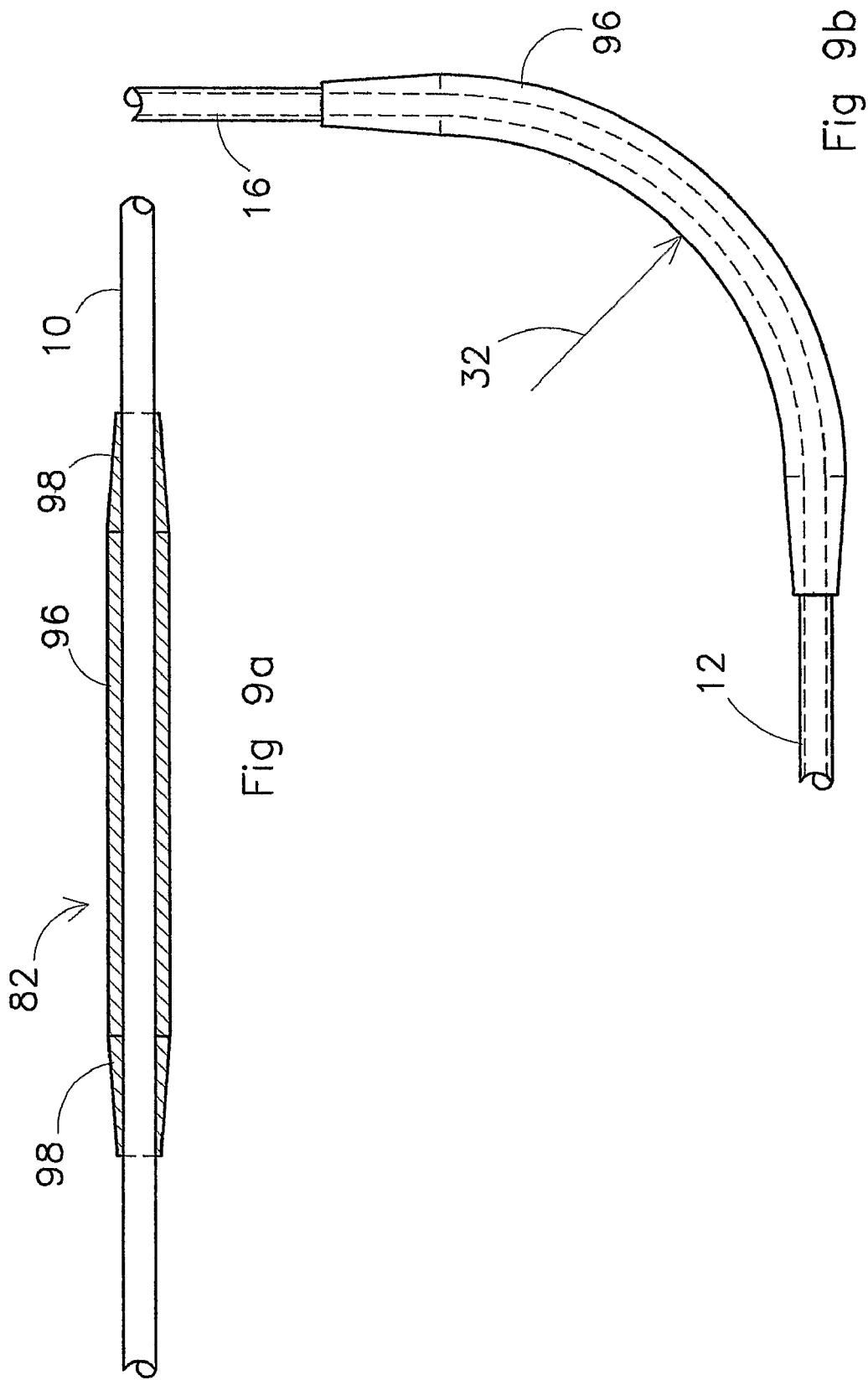

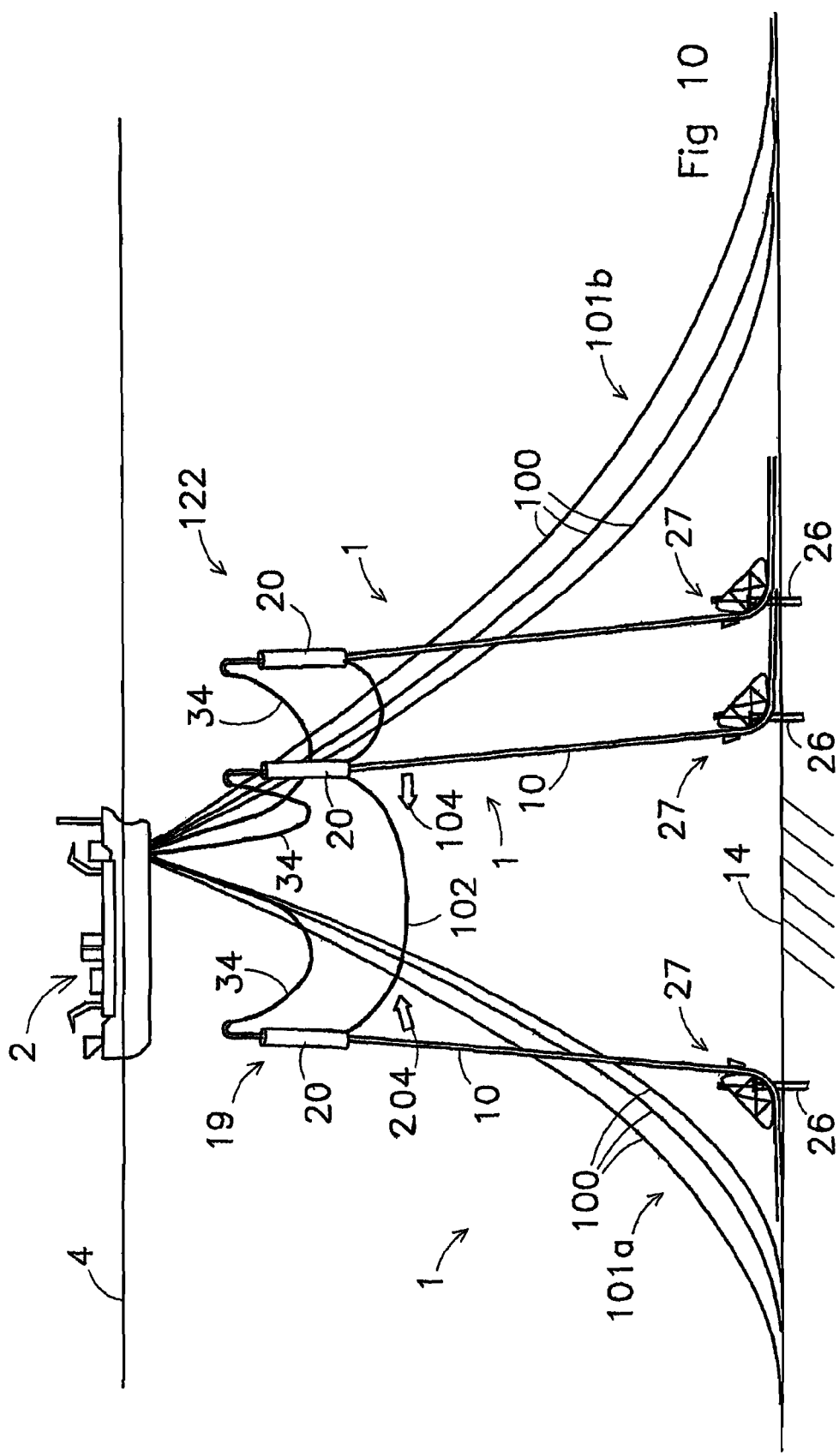

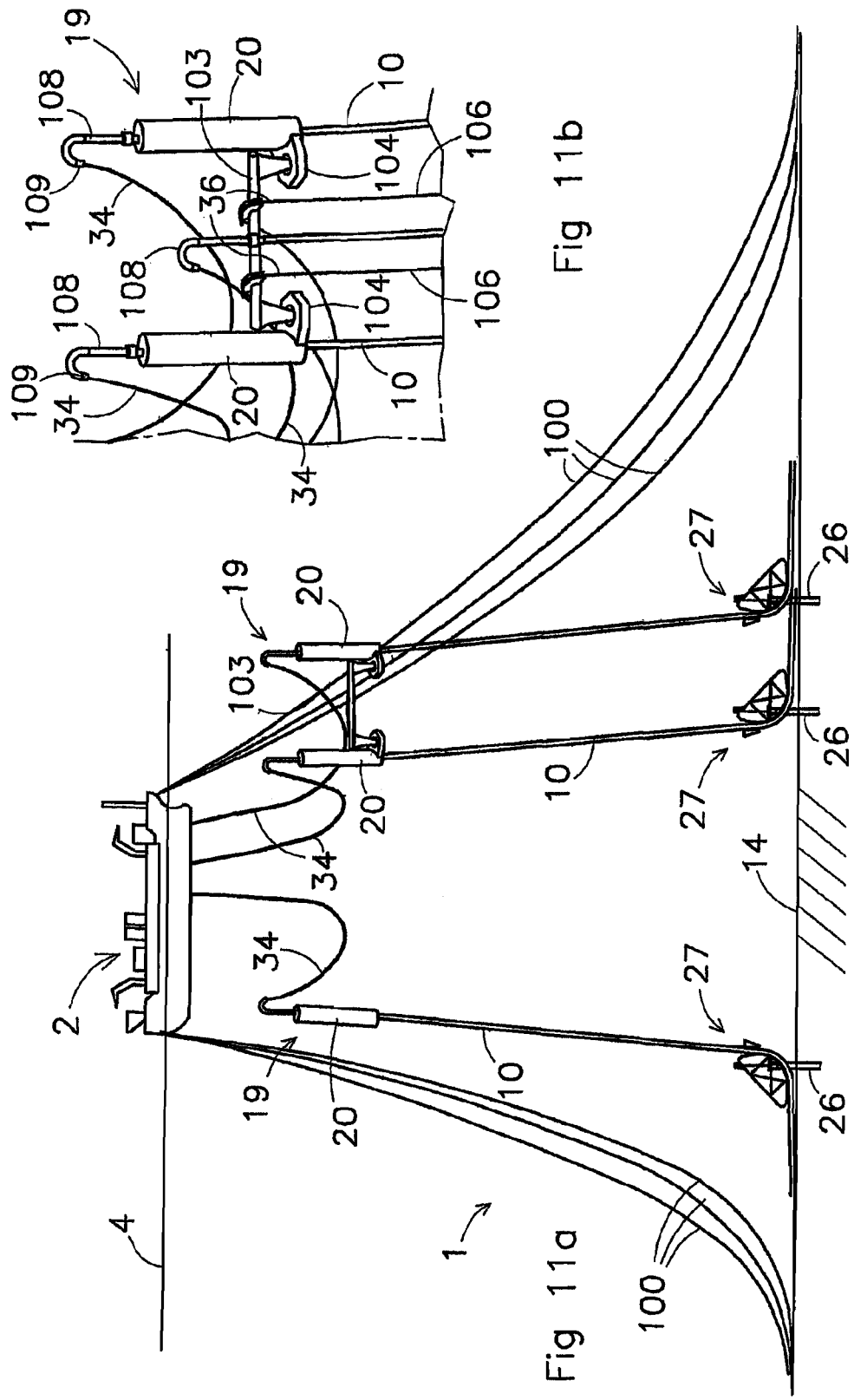

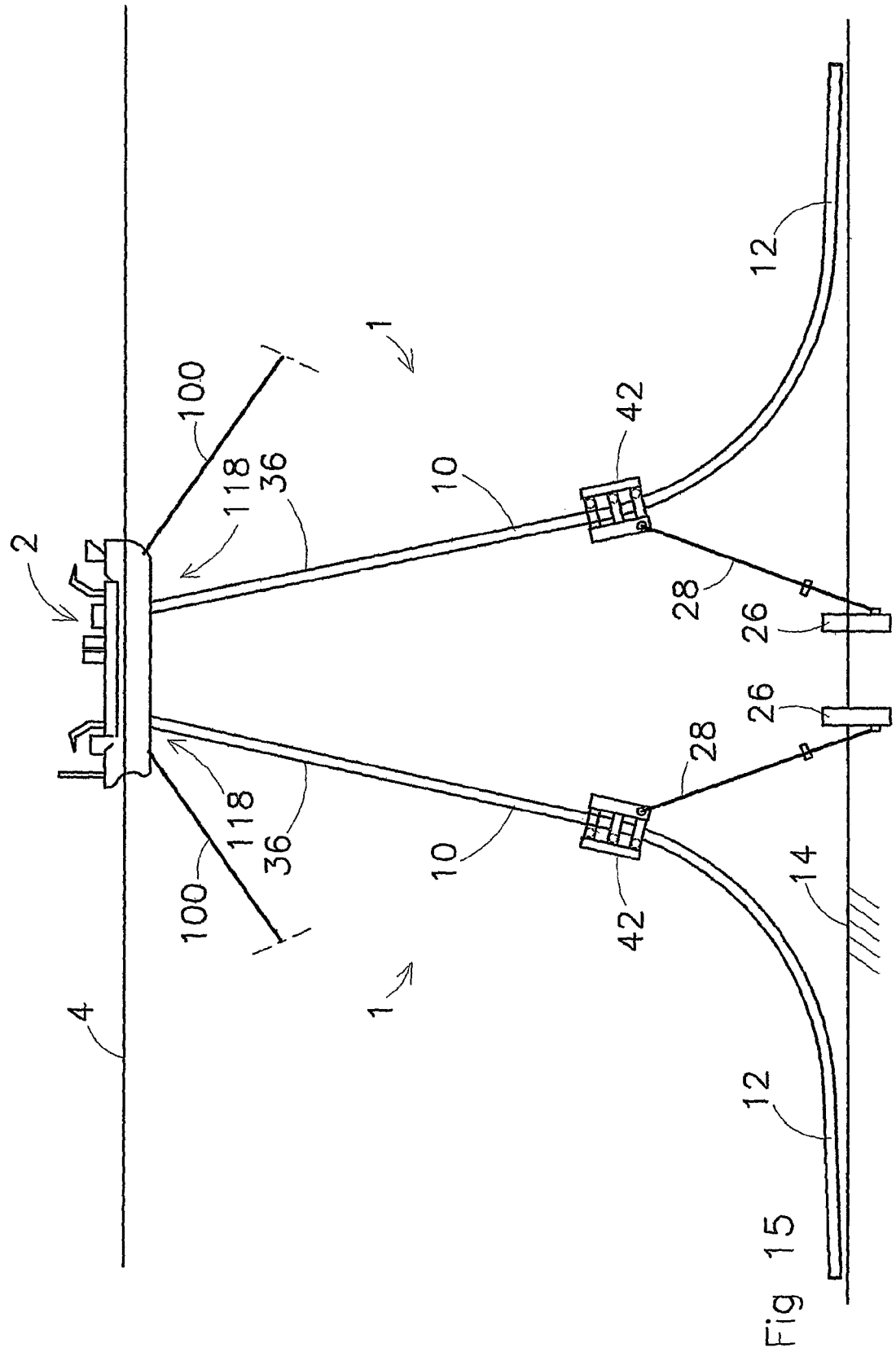

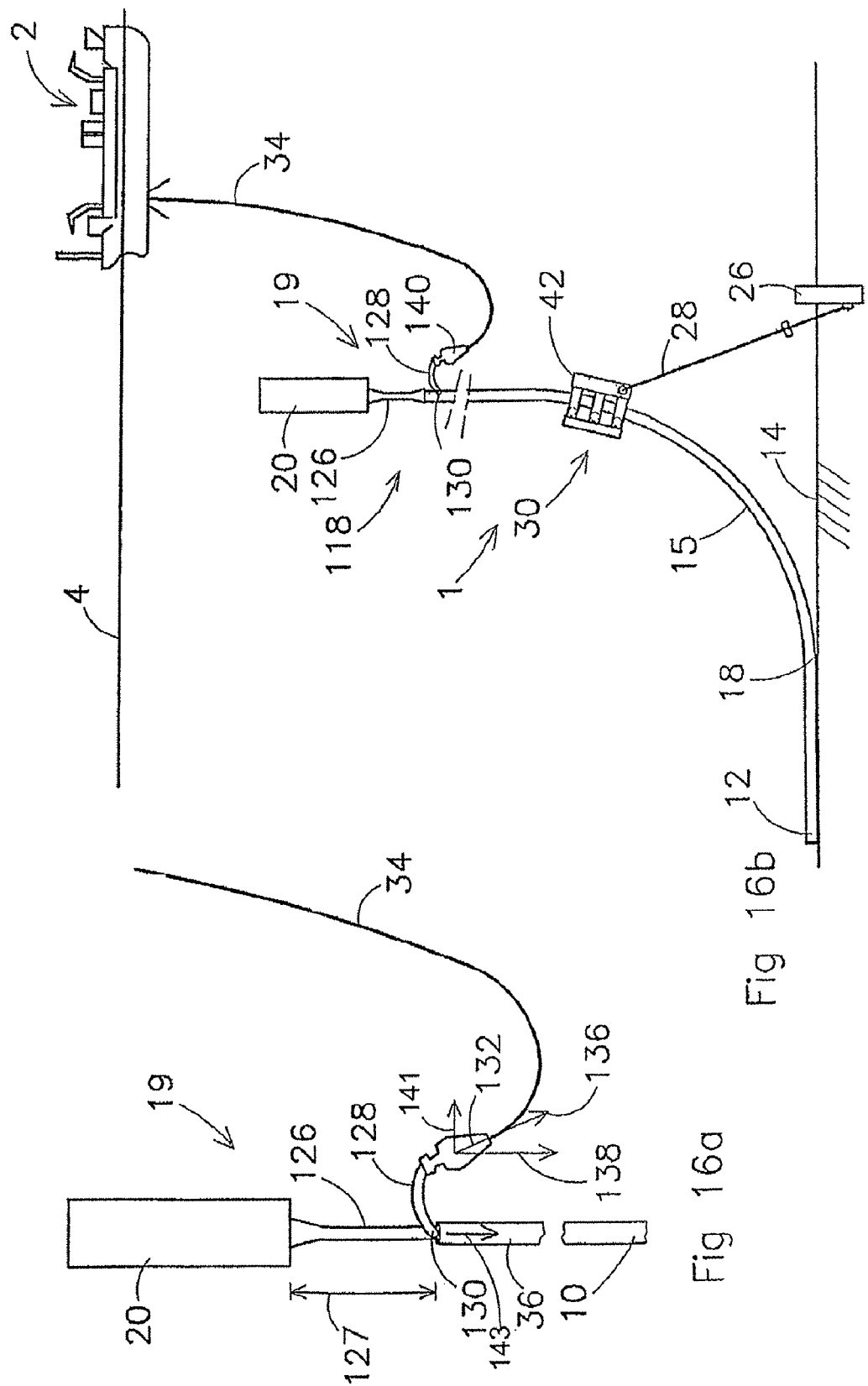

PIPELINE ASSEMBLY COMPRISING AN ANCHORING DEVICE

CROSS-REFERENCE TO RELATED APPLICATIONS

This application is the National Stage of International Application No. PCT/NL2006/000507, filed Oct. 9, 2006, which is a continuation-in-part of U.S. application Ser. No. 11/245,477, filed Oct. 7, 2005, now abandoned the contents of which is incorporated by reference herein.

FIELD OF THE INVENTION

The present invention relates to a pipeline assembly. The present invention further relates to a method for installing the pipeline assembly.

DESCRIPTION OF THE PRIOR ART

Pipelines are widely applied in the off-shore industry, for instance for conveying a fluid or a mixture of fluids from an oil well on a seabed to a target device located at a water surface. This target device may be a vessel or a platform, for instance a floating production and storage platform, generally known as an FPSO.

Often, a pipeline is laid which rests on a seabed over a certain distance and rises from the seabed at a certain point, which is generally known as the touch-down point. The pipeline curves upward from the touch-down point and extends to the target device. The section of the pipeline extending upwards from the seabed is generally indicated in the field of the art as a riser. The riser is often indicated as a Steel Catenary Riser (SCR), because it is generally made of steel and extends substantially along a trajectory of a catenary.

An advantage of the substantially catenary pipeline (or riser) is that complex structures in the pipeline are obviated. The pipeline may be connected to an oil well on the seabed at one end of the pipeline and be connected to the buoyancy device at a second, opposite (free) end of the pipeline, without any in-line structures in between, such as for instance a template.

In the field of the art, fatigue plays an important role in the design considerations of a riser. Every movement of the riser causes an increased fatigue of the pipeline and thus, a loss in lifetime. Improvements in the field of the art are often directed at decreasing the fatigue of the riser, thereby extending the lifetime.

A target device located at the water level is generally subject to forces from wind, waves and water currents, which cause movements and rotations of the target device. The movements may be both horizontal and vertical. Also, the target device may have a varying draft due to different loading conditions. If a delivery end of the riser is connected with the target device, the delivery end moves together with the target device, and the movements and rotations of the target device cause fatigue in the riser.

In order to reduce the movements of the delivery end, the delivery end of the pipeline may be connected to a separate buoyancy device, instead of connecting the delivery end directly to the target device. The buoyancy device generally has a target position which is below the water surface, at a depth at which forces from wind and waves do not substantially affect the position of the buoyancy device.

At least one flexible connecting pipeline connects the delivery end of the pipeline from the buoyancy device to the target device, providing a fluid connection. The movements of the target device thus do not disturb the riser. Also, the target device may be connected to—and disconnected from—the pipeline without disturbing or moving the pipeline itself. The connecting pipeline is generally indicated in the field of the art as a flexible.

The buoyancy device makes it possible to lay and install the pipeline with a pipeline laying vessel, and remove the pipeline laying vessel from the free end of the pipeline prior to the arrival of the target device at the installation location.

The depth at which the buoyancy device is positioned may for instance be 100 meter. The water depths for which this technology is typically applied may range between 1000 and 3000 meters. The flexible connecting pipeline between the delivery end of the pipeline and the target device may have a length of several hundreds of meter.

It is generally necessary to substantially fix at least the vertical position of the buoyancy device. For this end, the buoyancy device is anchored to the seabed by means of an anchoring line (also indicated in the field of the art as a tether), and the buoyancy device is provided with more buoyancy than necessary to support the delivery end of the pipeline. This ensures that the anchoring line is taut, and ensures a position of the buoyancy device which is substantially fixed in a vertical direction. The buoyancy device applies axial tension on the pipeline in the region above the coupling point.

The anchoring line which connects the buoyancy device with the seabed may, in case of a substantial water depth, have a considerable length. This is generally disadvantageous. Installing a long anchoring line is generally difficult.

Supporting the delivery end of the riser with a buoyancy device does not prevent all movements of the pipeline. Other factors also play a role. Changing water currents and Vortex Induced Vibrations exert dynamic forces on the pipeline along the length thereof. These forces may still cause movements of at least a part of the riser, thereby causing fatigue.

The dynamic forces on the riser section may in particular move the pipeline at the touch-down zone relative to the seabed. This causes an increased fatigue in the touch-down zone. In this respect, it is known from for instance OTC paper 16627 by S. Bhat et al., presented on May 3-6, 2004, that fatigue in the touch-down zone is critical in design considerations of risers.

Apart from an increased fatigue, a movement of the touch-down zone results in a risk of the seabed section of the pipeline being damaged, for instance due to wear and tear from the pipe-soil interaction.

In a riser assembly known from U.S. Pat. No. 4,023,517, a riser is provided having a flexible hose near the seabed which curves upwards from the seabed. The device of U.S. Pat. No. 4,023,517 has a grave disadvantage in that extensive construction work is necessary at the seabed in order to install the flexible hose and connect it to both the horizontal pipeline and the vertical riser. The device of U.S. Pat. No. 4,023,517 also extends above the water surface, thereby being influenced by forces from wind and waves, which seriously increase fatigue of the riser.

From U.S. Pat. No. 4,802,431 a riser system is known, which extends along a lazy wave curve from the seabed to a point at which anchor lines connect the riser with the seabed. A dead weight is provided in combination with the anchor lines, allowing the riser to move upwards, together with a vessel to which it is connected. The movement induces strong fatigue in the riser, leading to a short lifetime. The riser system of U.S. Pat. No. 4,802,431 extends above the water surface, and is thus influenced by forces from wind and waves, which further increases the fatigue of the riser.

From U.S. Pat. No. 4,906,137 a riser system is known, wherein a riser is connected via a rod to a dead weight. The riser extends along a lazy wave form to a location above the water surface where it is connected to a platform which moves under the influence of wind and waves. The combination of a lazy wave form and a direct connection to a platform at the water surface creates large, varying loads on the riser system, leading to strong fatigue and a short lifetime.

From U.S. Pat. No. 5,944,448 a riser system is known which comprises a flexible pipeline. Such a flexible pipeline is only suitable for smaller water depths. The riser is directly connected to a vessel at the water surface. The riser has a lazy wave form, and is connected to the seabed via a tether at a section of the pipeline which is substantially horizontal. This configuration leads to a strong fatigue of the pipeline, because large dynamic loads may be exerted on the pipeline. The large angle of the tether relative to the pipeline at the junction further induces a high bending moment in the riser at the junction.

SUMMARY OF THE INVENTION

It is generally desirable in the field of the art to reduce movements of the pipeline, in particular in the touch-down zone.

In an embodiment of the invention, a pipeline assembly is provided, comprising:
- a pipeline which is substantially rigid, the pipeline extending partly on a seabed, the pipeline further comprising a curved section which curves upwardly from the seabed, the pipeline extending to a delivery end thereof provided near a water surface;
- at least one anchoring device provided at the seabed;
- at least one connecting device connecting a coupling point on the pipeline with the anchoring device, the connecting device being configured to substantially limit an upward movement of the coupling point;
- a support device coupled to the pipeline at the delivery end. The connecting device limits the freedom of movement of the coupling point, thereby substantially reducing movements in the touch-down zone of the pipeline. Hence, fatigue of the pipeline, in particular in the touch-down zone, is substantially decreased.

An upward movement of the coupling point may not completely be prevented, because the connecting device may in some embodiments of the invention pivot about the anchoring point over a small angle. A small upward movement of the coupling point may then occur. However, the coupling point is prevented from moving upward over a substantial distance.

During the installation of the pipeline, a pipeline laying vessel may lay the pipeline in a J-lay mode, S-lay mode or in a reel mode by spooling the pipeline from a reel. The pipeline is generally first laid on the seabed over a certain distance. Subsequently, the riser section of the pipeline is installed. Finally, the delivery end of the pipeline is supported at or near the water surface, in order to fix the position of the pipeline.

A single anchoring device with a single connecting device may be provided, or a plurality of anchoring devices may be provided at the seabed at a distance from one another, each anchoring device having a connecting device via which the coupling point is connected to the anchoring device.

Factors that determine the trajectory of the pipeline may be gravity, the bending stiffness of the pipeline and the supporting conditions at the delivery end.

The pipeline generally has a steel wall, which is thick relative to an inner diameter of the pipeline. The pipeline is thus heavier than the surrounding water, and will have the tendency to sink, regardless of a medium with which the pipeline is filled.

The section of the pipeline resting on the seabed may be indicated as the seabed section, whereas the section of the pipeline extending from the seabed to the delivery end of the pipeline may be indicated as the riser section. The seabed section ends at the touch-down point. From the touch-down point, the pipeline extends along a curved trajectory upward.

The curvature of the pipeline is minimal at the touch-down point. From the touch-down point, the curvature of the pipeline increases in a direction away from the touch-down point, toward a point where the curvature reaches a maximum, indicated as a maximum curvature point. From this point, the curvature gradually decreases in a direction towards the delivery end of the pipeline. The upper part of the riser section generally has only a slight curvature and extends substantially vertically.

In an embodiment, the support device comprises at least one buoy which is positioned at a distance below the water surface. The delivery end also ends at a distance below the water surface. The pipeline can thus be supported independently from the target device, such that movements of the target device do not affect the pipeline. In use, an intermediate flexible pipeline provides a fluid connection between the delivery end and the target device.

In one aspect, a section of the pipeline between the coupling point and the delivery end is substantially straight. The bending moments in the pipeline due to the upward force from the buoyancy device are thus advantageously limited.

In one aspect, the pipeline is locally reinforced at and/or near the coupling point in order to withstand a bending moment which is locally higher due to a force which is applied on the pipeline by the connecting device. In this way, the coupling point may be located lower than with a non-reinforced pipeline, leading to a shorter and simpler connection device.

In one aspect, the coupling point is positioned at approximately 300-900 meters above the seabed, in particular between 600 and 800 meter above the seabed. Surprisingly, the distance has been found to provide a high stiffness and a low fatigue of the riser in case of a riser having an outer diameter of approximately 12 inch.

It has been found that for a riser having a smaller outer diameter than 12 inch the coupling point is to be positioned at a distance of less than 700 meter from the seabed. It has been found that for a riser having an outer diameter of more than 12 inch, the coupling point is to be positioned at more than 700 meter from the seabed.

In one aspect, the angle between a longitudinal axis of the pipeline and a vertical axis decreases when viewed along the pipeline from a touch down point to the coupling point. A monotonous upward curve, without any lazy wave between the touch down point and the coupling point has been found to produce relatively small movements of the pipeline and hence, low fatigue.

In one aspect, the connecting device extends along a substantially catenary trajectory from the anchoring device to the coupling device. It has been found that a cable which follows a catenary curve provides a suitable anchoring of the pipeline.

In an embodiment, the connecting device comprises a pipeline shaping device for shaping at least part of the pipeline along a trajectory having a substantially predetermined curvature. The pipeline shaping device prevents the pipeline from adopting a too strong curvature, leading to ovalization or to buckling or kinking of the pipeline.

In an embodiment, the pipeline shaping device comprises a contact surface which at least in part faces downward, wherein the contact surface curves upward. The pipeline may be positioned against the contact surface, restricting the bending of the pipeline along the curvature of the contact surface.

In an embodiment, the contact surface has a curvature radius which is chosen relative to the diameter of the pipeline in such a way, that the pipeline is elastically deformed when engaging the contact surface along a length thereof. The behavior of the material of the pipeline in elastic deformations is well known.

Alternatively, in an embodiment, the contact surface has a curvature radius which is chosen relative to a diameter of the pipeline in such a way, that the pipeline is plastically deformed when engaging the contact surface along a length thereof. The radius of the curvature can be relatively small, allowing the use of a relatively small pipeline shaping device.

In an embodiment, the connecting device comprises a first coupling device provided on the pipeline at a coupling point above the seabed, and a connecting organ connecting the first coupling device with the anchoring device. The connecting organ may be elongate, having a first end which is connected to the first coupling device and having a second, opposite end which is connected to the anchoring device.

In one aspect, the anchoring device is fixed to the seabed. Contrary to a dead weight, the fixed anchoring device cannot be lifted upward when a strong upward force which exceeds the dead weight is applied to it.

This configuration provides a simple way of preventing the coupling point from moving upward. An upward force exerted in the pipeline by the support device can substantially be diverted to the connecting device.

In an embodiment, the pipeline assembly comprises a curvature limiting device, fitted along at least a part of the curved section of the pipeline, the curvature limiting device being configured to limit a maximum curvature of the pipeline of said pipeline part. The pipeline can be bent at the curved section thereof without a risk of bending the pipeline too much, causing ovalization or damage to the pipeline.

In an embodiment, the connecting device is connected to the pipeline at a coupling point, wherein at the coupling point a longitudinal axis of the pipeline extends at an angle of less than ten degrees, in particular less than five degrees, to the vertical.

A bending moment in the pipeline caused by a vertical force exerted on the pipeline at the coupling point is dependent on the angle at which the pipeline extends at the coupling point. If the angle is small, an upward force will cause only a small bending moment in the pipeline at the coupling point.

Preferably, at the coupling point a longitudinal axis of the pipeline extends substantially vertically. The pipeline may thus be substantially free of bending moments at the coupling point, in case of vertical forces exerted on the pipeline at the delivery end thereof.

In an embodiment, the connecting organ is elongate and extends at least in part at an angle of less than ten degrees, in particular less than five degrees to the vertical. Preferably, the connecting organ extends substantially vertically. This orientation further reduces the bending moments in the pipeline.

The connecting device may also have a function of exerting a horizontal force on the pipeline in a direction away from the touch down point. This prevents the buoyancy device and/or the riser section from moving toward the touch down point, in which case a too strong curvature could be imparted to the curved section and the pipeline could plastically deform and/or be damaged.

In an embodiment, the first coupling device of the connecting device is constructed in order to allow a rotation of the pipeline relative to the connecting organ about a horizontal axis. This further reduces bending moments in the pipeline at the coupling point.

In an embodiment, the first coupling device of the connecting device is configured to couple the pipeline to the connecting device by moving the pipeline against an operating organ of the first coupling device. The connecting device may thus be pre-installed and laid on the seabed, whereafter the pipeline may simply be laid on the coupling device, thereby making the connection.

In an embodiment, the pipeline assembly comprises an anchoring coupling device, which is configured to couple the connecting device to the anchoring device by moving the connecting device against an operating organ of the anchoring coupling device. The connecting device may thus be connected to the pipeline at the pipeline laying vessel, subsequently lowered to the seabed and coupled to the anchoring device, which has previously been installed.

In an embodiment, the buoyancy of the buoyancy device is controllably variable. The buoyancy device may be filled with water when the buoyancy device is lowered under the water surface with the pipeline, which reduces a risk of collapsing of the buoyancy device due to hydrostatic pressure. When the delivery end is at its delivery end target location, the buoyancy may be increased, thereby supporting the pipeline.

In an embodiment, the pipeline is at least in part manufactured from a group of pipeline parts, comprising: steel pipe, flexible pipe, coated steel pipe, steel pipe with anodes, plastic pipe, steel pipe-in-pipe, welded steel pipe sections, threaded steel pipe sections and a steel pipe with external foam sections.

These parts are very suitable for manufacturing risers.

In one aspect the pipeline is manufactured from a plurality of pipe sections which are joined together on a pipeline laying vessel, wherein the coupling point is provided on a particular pipe section at a distance from both ends of said pipe section.

The pipe sections are generally welded end-to-end. The bending moment at the coupling point generally shows a sharp local rise. In order to minimize the bending moment in the welding zones near the ends, it is advantageous to position the coupling point as far away from the ends as possible, thus substantially in the middle of the pipe section.

In one aspect, a substantial part of said pipe section is reinforced relative to the adjoining pipe sections, in particular in such a way that said pipe section has ends which have a similar cross-section as the cross-section of the ends of adjoining pipe sections, such that the reinforced pipe section can be welded to the adjoining pipe sections in a normal fashion.

It is preferred to be able to weld the reinforced pipe section in a normal fashion, i.e. with a normal weld, because it is usually difficult to achieve a high quality standard for different welds. Since quality is important, it is generally preferred to use the same weld for the reinforced section as for the other sections.

The reinforced part of the pipe section may therefore extend over a substantial part of the pipe section and gradually taper towards a normal cross-section at the ends. The reinforcement may comprise a greater wall thickness, or be a different suitable type of reinforcement. In an embodiment, the support device is anchored to the seabed by anchoring means. Anchoring the support device to the seabed further reduces movements of the pipeline, thereby further decreasing fatigue. The anchoring means may comprise a tether, a mooring line and/or other anchoring means.

In an embodiment, at least one curvature buoyancy device is connected to the pipeline, the curvature buoyancy device extending along a part of the riser section and configured to support the pipeline along a lazy wave trajectory.

In a lazy wave trajectory, the angle of the main longitudinal relative to a vertical axis increases up to a certain turning point, when viewed in an upward direction from the coupling point. From the turning point, the angle of the main longitudinal relative to the vertical axis decreases again, when viewed in an upward direction.

The at least one curvature buoyancy device dampens movements of the delivery end such that the movements do not propagate to the touch-down area, thereby further reducing movements and fatigue in the touch-down area.

In an embodiment, the at least one curvature buoyancy device comprises a number of buoyancy elements fitted along the pipeline. This embodiment provides a simple way of enabling a lazy wave configuration.

In an embodiment, the support device comprises a target device positioned at the water surface. The pipeline may then be directly connected to the target device, for instance in case the position of the target device is substantially fixed, or in combination with a lazy wave configuration.

The invention also relates to a pipeline device comprising at least a first pipeline assembly and a second pipeline assembly connected to one another at a substantial distance above the seabed, by an inter-pipeline connecting device. If a pipeline is only connected to the seabed at the coupling point, and the delivery end is connected to a buoyancy device, the delivery end may move horizontally over a substantial distance. By providing a connection between two pipelines, the horizontal movements of the pipelines, in particular movements of the delivery ends, are substantially reduced. The total horizontal stiffness of the combined pipeline assemblies is substantially increased.

In an embodiment, the inter-pipeline connecting device is provided with a prestress, pulling at least part of the first and second pipeline assembly toward one another over a predetermined distance. This further reduces the horizontal movements of the pipelines.

In an embodiment, the inter-pipeline connecting device comprises a substantially flexible organ connected at a first end thereof to the first pipeline assembly, and connected at a second end thereof to the second pipeline assembly, the substantially flexible organ provided with a substantial mass. This is a simple way of providing a prestress.

In an embodiment, the inter-pipeline connecting device is connected to the pipeline of the first pipeline assembly and the pipeline of the second pipeline assembly at the respective delivery ends thereof. This is a logical location for connecting the inter-pipeline connecting device.

In an embodiment, the first pipeline and the second pipeline are supported by a common support device comprising the inter-pipeline connecting device. If two pipelines are supported by a common support device, a single buoyancy device may be provided. Horizontal movements of the delivery ends are also substantially reduced.

In an embodiment, the support device comprises a connector which is connected at a first end thereof to the delivery end and at a second end thereof to a flexible connecting pipeline, wherein the connector has an arcuate form, and wherein the first end and second end are oriented substantially downward. This allows both the pipeline and the connecting pipeline to be suspended from the connector, reducing bending moments both in the pipeline and the connecting pipeline.

The buoyancy device may be fitted around the pipeline, such that the pipeline protrudes from an upper end of the buoyancy device. Alternatively, the buoyancy device may be positioned above the delivery end. Other positions of the buoyancy device are also possible, for instance adjacent the pipeline.

The invention further relates to a pipeline shaping device for use in the pipeline assembly.

The invention also relates to a support device for use in the pipeline assembly.

The invention further relates to a method for installing a pipeline assembly, the method comprising:
   a) positioning a pipeline at least partly on a seabed by a pipeline laying vessel, the pipeline being substantially rigid, the pipeline comprising a curved section which curves upwardly from the seabed, the pipeline extending to a delivery end thereof which is supported by the pipeline laying vessel;
   b) providing at least one anchoring device at the seabed;
   c) connecting the pipeline at a coupling point to the anchoring device by at least one connecting device, the at least one connecting device being configured for substantially limiting an upward movement of the coupling point;
   d) positioning the delivery end at a delivery end target position;
   e) supporting the pipeline at the delivery end by a support device; and
   f) disconnecting the pipeline from the pipeline laying vessel. According to the method, a pipeline can be installed in a simple way having a coupling point which is prevented from moving upward.

In an embodiment, step c comprises:
   c1) coupling a connection device to the pipeline; and
   c2) moving at least part of the pipeline downward, in order to couple the connecting device to the anchoring device.

In an embodiment, step c comprises:
   c1) coupling a connection device to the anchoring device; and
   c2) moving at least part of the pipeline downward, in order to couple the connecting device to the anchoring device.

In these embodiments, the pipeline can be connected to the anchoring device by moving the coupling point as specified. This movement can be effectuated by the pipeline laying vessel at the water surface, thereby obviating a need for complex underwater operations, for instance with a Remotely Operated Vehicle (ROV).

In one aspect, in step c1) the connection device is laid on the seabed, the connection device extending from the anchoring device in a direction from which a pipeline approaches the anchoring device as it is being laid. The pipeline thus reaches the connecting device as it is laid and can be simply connected to the connecting device.

In an embodiment, the method comprises coupling at least one buoyancy device to the pipeline prior to connecting the pipeline to the anchoring device. The buoyancy device may thus be coupled to the pipeline at the pipeline laying vessel, where this operation can easily be performed.

In an embodiment, the method comprises pre-installing the anchoring device prior to step (a). In an embodiment, the method comprises pre-connecting the connecting device with the anchoring device, and coupling the pipeline with the connecting device during step (c). Hence, the pipeline itself is further simplified and can be performed by a single pipeline laying vessel.

In an embodiment, the method comprises connecting the connecting device to the pipeline at the pipeline laying vessel, wherein step (c) comprises coupling the connecting device to the anchoring device. Only one coupling operation need be performed at the seabed, and this coupling operation may be performed by maneuvering the pipeline by the pipeline laying vessel.

In an embodiment, step (c) comprises lowering a delivery end of the pipeline from the pipeline laying vessel by a hoisting device. This is a simple way of moving the coupling point toward the anchoring device, for coupling the coupling point with the anchoring device by the connecting device.

In an embodiment, step (d) comprises connecting a flexible connecting pipeline to the buoyancy device at the pipeline laying vessel and connecting the flexible connecting pipeline with a target device after positioning the delivery end at the delivery end target position. This obviates a need for coupling the connecting pipeline with the delivery end at the target depth of the delivery end.

In an embodiment, the method comprises providing a pipeline shaping device connected with the anchoring device and bending the pipeline substantially around the pipeline shaping device during step (d).

The required form and position of the pipeline can be achieved by simply maneuvering the delivery end by the pipeline laying vessel. Hence, no complicated operations at the seabed are necessary.

In an embodiment, the method comprises laying the pipeline at least partially on the seabed near the pipeline shaping device and subsequently moving the pipeline substantially horizontally to a position wherein a part of the pipeline is situated underneath the pipeline shaping device, prior to the bending of the pipeline.

This obviates a need for a very accurate laying of the pipeline relative to the pipeline shaping device.

The invention is explained in more detail in the text which follows with reference to the drawing which shows a number of embodiments which are given purely by way of non-limiting examples.

BRIEF DESCRIPTION OF THE DRAWINGS

FIG. 1 shows a schematic side view of a pipeline assembly according to the invention;

FIGS. 2a1, 2a2, 2a3, 2a4, 2a5 and 2b1, 2b2, 2b3, 2b4, 2b5 show a schematic side view of a series of steps of a method of installing the pipeline assembly according to the invention;

FIGS. 2c1, 2c2, 2c3 and 2d1, 2d2, 2d3 show a schematic side view of a series of steps of another method of installing the pipeline assembly according to the invention;

FIG. 2e shows an elevated view of an embodiment of a first coupling device along the lines A-A of FIG. 2f;

FIG. 2f shows a schematic side view of a pipeline positioned on a first coupling device;

FIG. 2g shows a first coupling device;

FIGS. 2i, 2j, 2k, 2l and 2m show schematic side views of an embodiment of the method of installing the pipeline assembly;

FIGS. 3a and 3b show schematic side views of embodiments of a coupling device;

FIG. 3c shows a schematic side view of another coupling device according to the invention;

FIG. 3d shows a schematic front view of a coupling device according to the invention;

FIG. 4a shows a schematic front view of a connecting device;

FIG. 4b shows a schematic side view of a connecting device;

FIGS. 5a1, 5a2, 5a3, 5a4 and 5b1, 5b2, 5b3, 5b4, 5b5, 5b6 show a schematic side view of a series of steps of a method of installing the pipeline assembly according to the invention;

FIGS. 5c1, 5c2, 5c3, 5c4 and 5d1, 5d2, 5d3 show a schematic side view of a series of steps of another method of installing the pipeline assembly according to the invention;

FIG. 5e shows an axonometric view of an embodiment of the delivery end of the pipeline assembly according to the invention;

FIG. 5g shows a side view of an embodiment of the delivery end of the pipeline assembly according to the invention;

FIG. 5f shows a top view of an embodiment of the delivery end of the pipeline assembly according to the invention;

FIG. 6 shows a schematic side view of another embodiment of a pipeline assembly according to the invention;

FIGS. 7a, 7b, 7c, 7d, 7e show a schematic side view of a series of steps of a method of installing the pipeline assembly according to the invention;

FIG. 8b shows a schematic front view of an embodiment of a connecting device;

FIG. 8c shows a schematic side view of an embodiment of a connecting device;

FIGS. 8d1, 8d2, 8d3 and 8e1, 8e2, 8e3, 8e4 show a schematic side view of a series of steps of a method of installing the pipeline assembly of FIGS. 8a-8c;

FIG. 9a shows a schematic side view of a pipeline comprising a curvature limiting section;

FIG. 9b shows a schematic side view of a curved pipeline comprising a curvature limiting section;

FIG. 10 shows a schematic side view of a pipeline assembly comprising a plurality of pipeline assemblies;

FIG. 11a shows a schematic side view of another embodiment of the pipeline assembly;

FIG. 11b shows an enlarged axonometric view of another embodiment of the pipeline assembly;

FIG. 15 shows a schematic side view of yet another embodiment of the pipeline assembly according to the invention; and FIGS. 16a and 16b show schematic side views of embodiments of a support device.

DETAILED DESCRIPTION OF PREFERRED EMBODIMENTS

Figure 6:
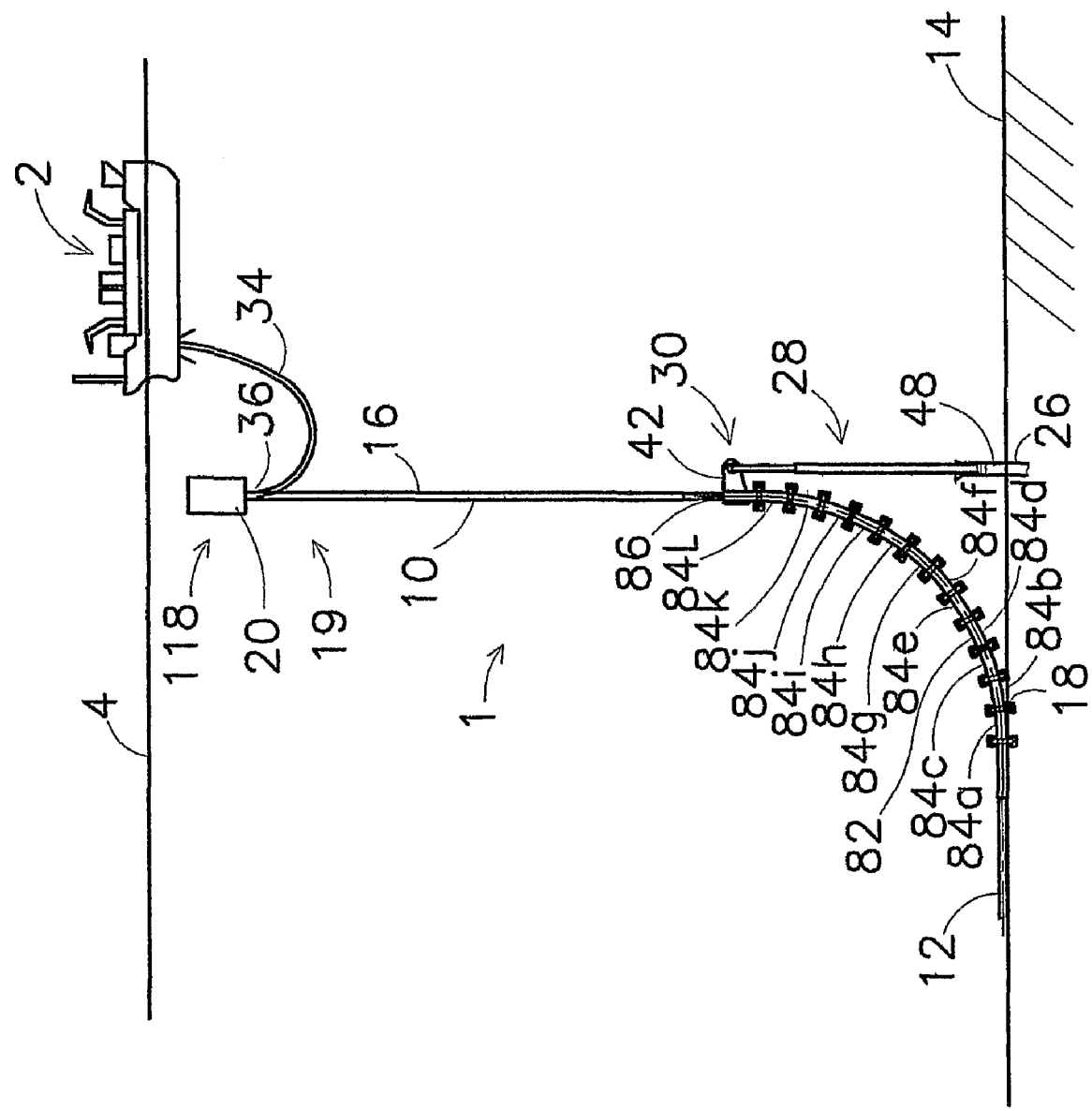

FIG. 1 shows an embodiment of a pipeline assembly 1 according to the invention. A target device 2 is shown, positioned at a water surface 4. The target device 2 may be an FPSO, or a different kind of vessel. The water 6 may have a substantial depth 8, for instance ranging between one and three kilometres.

A pipeline 10 comprises a seabed section 12, which rests on a seabed 14, and a riser section 16, which extends from a touchdown point 18 at the seabed 14 to a buoyancy device 20, positioned at a depth 22 under the water surface 4. The buoyancy device 20 exerts an upward force on the pipeline 10. The depth 22 is chosen such, that the buoyancy device 20 is substantially free of forces of waves and wind. At least one flexible pipeline 34 connects a delivery end 36 of the pipeline 10 to the target device 2 for providing a fluid connection between the delivery end 36 and the target device 2. The seabed section 14 may be connected at one end thereof to an oil well (not shown).

An anchoring device 26 is provided at the seabed 14. The anchoring device 26 may be a suction pile, a driven pile, a dead weight, a concrete structure, or a different kind of anchoring device. A connecting device 27 connects the pipeline 10 with the anchoring device 26. The connecting device 27 comprises an elongate connecting organ 28 in the form of a cable or line which extends from the anchoring device 26 to a coupling point 30 on the pipeline 10. The connecting organ 28 may extend substantially vertically, or at a small angle to a vertical axis 73, for instance at an angle of five or ten degrees relative to a vertical axis 73.

The connecting organ 28 exerts a substantially downward force on the coupling point 30, preventing the buoyancy device 20 from floating upwards, and thus keeping the pipeline 10 substantially in a fixed vertical position. The connecting device 27 thus limits a freedom of movement of at least a part of the curved section (15). It is also possible that the anchoring device 26 comprises at least two anchoring points (not shown) spaced apart at the seabed 14, wherein the coupling point 30 is connected to each anchoring point.

Preferably, the at least two anchoring points are spaced apart in a direction perpendicular to the longitudinal axis 69 of the pipeline 10. Alternatively, the at least two anchoring points may be spaced apart in a direction parallel to the longitudinal axis 69 of the pipeline. The coupling point 30 may substantially be prevented from moving horizontally.

From the touchdown point 18, the riser section 16 follows a curved trajectory upward. The riser section 16 extends at an angle relative to a vertical axis 73, wherein the angle α decreases in an upward direction. The riser section 16 may have substantially a form of a catenary, wherein the curvature of the pipeline 10 varies along the pipeline.

The curvature of the pipeline is defined by a curvature radius 32. The curvature of the pipeline increases along the pipeline from the touchdown point 18 toward a maximum curvature point 24. From the maximum curvature point 24, the curvature decreases along the pipeline in an upward direction. At a certain distance above the seabed 14, the pipeline 10 has only a slight curvature and extends substantially vertically toward the buoyancy device 20.

A horizontal distance between the buoyancy device 20 and the coupling point 30 is thus relatively small compared to a horizontal distance between the buoyancy device 20 and the touch-down point 18 of the pipeline 10. The curvature of the pipeline 10 at the coupling point 30 is substantially smaller than a maximum curvature of the pipeline 10 occurring below the coupling point 30.

A curvature radius 32 of the pipeline 10 at the coupling point 30 is typically greater than 500 times the external diameter 71 of the pipeline 10.

The pipeline assembly 1 provides a substantially catenary pipeline assembly which suffers less from disadvantages of the prior art. Fatigue in the touch-down zone is substantially less than in known risers. The touch-down point is substantially fixed relative to the seabed. A simple and effective way of anchoring a substantially catenary riser having a delivery end supported by a buoyancy device to the seabed is thus provided.

Turning to FIGS. 2a1-2a5 and 2b1-2b5 an embodiment of a method of installing the pipeline assembly 1 according to the invention is shown in steps I-X.

In a first step I, the pipeline 10 is laid by the pipeline-laying vessel 40. As shown, the pipeline is being laid in a J-lay mode. It is also possible to lay the pipe in an S-lay mode or by spooling it from a reel (not shown). The connecting device 27 comprises a first coupling device 42 which is connected at the pipeline laying vessel 40 to the pipeline 10 during the laying process of the pipeline 10. The coupling device 42 may be a clamp, installed on the pipeline 10 as an in-line structure.

The connecting organ 28 is connected at one end 44 thereof to the coupling device during the pipeline laying process at the pipeline laying vessel. The connecting organ 28 may be a tether, a tendon, a cable, a line, a chain, or another suitable device.

The connecting device 27 further comprises an anchoring coupling device 48 which is provided at an opposite end 46 of the connecting organ 28, for instance in the form of a hook or a so-called ballgrab connector. The anchoring coupling device 48 is configured to be coupled to the anchoring device 26. The anchoring device 26 comprises a mating part 49, for instance in the form of an eye or a receptacle for a ballgrab connector.

As the pipeline 10 is being laid, the first coupling device 42 is moved downward, toward the seabed 14.

In step II, a final pipe section is joined to the pipeline and the pipeline 10 has reached its target length. If the pipeline 10 is laid in a reel mode, the pipeline 10 is completely spooled from a reel or cut from a length of pipe remaining on a reel, the cut positioned at the location of the delivery end 36 (not shown). The first coupling device 42 has a position at a certain distance above the seabed 14.

In step III, the connecting organ 28 is positioned on the seabed 14 over at least a part of its length, possibly in a bended form. For this end, the connecting organ 28 is substantially flexible.

The anchoring device 26 may have been pre-installed by another vessel prior to the laying the pipeline 10, or may be installed by the pipeline-laying vessel 40, for instance when the pipeline-laying vessel 40 is positioned substantially above a target location 52 of the anchoring device 26. In FIG. 2a, this would be a position of the pipeline laying vessel between step I and II.

In order to couple the anchoring coupling device 48 to the anchoring device 26, the pipeline 10 may be maneuvered by the pipeline-laying vessel 40 in such a way, that the anchoring coupling device 48 engages the mating part 49 on the anchoring device 26, and is subsequently coupled with the anchoring device 26. For this end, it may be necessary to lower the delivery end 36 of the pipeline 10 from the pipeline-laying vessel 40, for instance by means of an Abandonment and Recovery (A&R) device 54, as is shown in step IV.

Possibly, the delivery end 36 is lowered entirely to the seabed 14, as is shown in step V. During this process, the pipeline-laying vessel 40 is moved in the direction of the pipeline, as is shown by double arrow 50. However, it may also be possible to lower the delivery end 36 to only a limited depth, which is sufficient for the anchoring coupling device 48 to engage the anchoring device 26.

There may also be other methods and means for connecting the anchoring coupling device 48 to the anchoring device 26. The anchoring coupling device 48 may comprise communication means and be remotely operable. The anchoring coupling device 48 may also comprises drive means, which are configured to move the second coupling means toward the anchoring device 26 and couple the anchoring coupling device 48 to the anchoring device 26.

As is shown in step VI, it is possible to disconnect the A&R-device 54 from the delivery end 36 of the pipeline 10. The pipeline-laying vessel 40 may then be moved away from the installation site, for instance in order to lay another pipeline or for installing the anchoring device 26 and connecting the anchoring coupling device 48 to it, when the anchoring device 26 was not preinstalled (not shown).

In step VII, the pipeline-laying vessel 40 lifts the delivery end 36 of the pipeline 10 from the seabed 14 with the A&R-device 54, and moves it upward. At the same time, the delivery end 36 is moved in a horizontal direction, towards a position substantially above the anchoring device 26. The pipeline 10 is thus substantially rotated about the touch-down point 18. At the same time, the touch-down point 18 itself moves, because the pipeline 10 is lifted from the seabed 14.

In steps VIII and IX, the riser section 16 of the pipeline 10 is completely lifted from the seabed 14, in order to adopt its target position. The delivery end 36 of the pipeline 10 is gradually moved upwards and positioned substantially above the anchoring device 26.

The first coupling device 42 is also gradually moved upward. During the raising of the pipeline 10, the pipeline-laying vessel 40 is gradually moved horizontally toward a location 56 substantially above the anchoring device 26. As the riser section 16 adopts its target position, the connecting organ 28 is pulled substantially taut.

In step X, the delivery end 36 of the pipeline 10 is positioned at a delivery end target position 118. A buoyancy device 20 is connected with the delivery end of the pipeline 10. The buoyancy device 20 supports the delivery end 36 of the pipeline 10. The pipeline 10 is suspended from the buoyancy device 20. The force exerted by the A&R-device 54 on the delivery end 36 of the pipeline 10 may now be reduced, and the A&R-device 54 can be disconnected from the delivery end 36 of the pipeline 10.

In the target position, the first coupling device 42 is positioned substantially above the anchoring device 26, or at a relatively small horizontal distance from the anchoring device 26. The connecting organ 28 may have a length of approximately 50-400 meters, depending on the diameter of the pipeline 10. When the pipeline 10 has a large diameter, the bending radius 32 of a curved section 15 of the pipeline 10 is relatively large, in order to limit tensions occurring in the pipeline 10 and to ensure, that only elastic deformations occur. When the diameter of the pipeline 10 is relatively small, the radius 32 of the curved section 15 of the pipeline 10 may be relatively small. This allows a smaller length of the connecting organ 28. Typically, when the diameter of the pipeline is 12.75 inch and a wall thickness is 25 mm, the radius 32 of the curvature is in the order of 250 meter. The buoyancy device may have a cylindrical form, having a diameter of 10 meter and a length of 18 meter. The cylindrical buoyancy device 20 may be oriented substantially vertically.

Instead of connecting the buoyancy device 20 to the delivery end 36 of the pipeline in step X, it is also possible to connect the buoyancy device 20 earlier, for instance in step II, when the pipeline has reached its full length. In this case, the buoyancy device 20 may have a buoyancy which can be controllably varied, for instance by either filling the buoyancy device with air or water, or by partly filling the buoyancy device with air and partly with water.

In steps II-V, the buoyancy device 20 will be substantially filled with water, in order to enable the lowering of the delivery end 36 including the buoyancy device 20.

In step VII, the buoyancy of the buoyancy device 20 may be increased, aiding in the raising of the pipeline 10. When the buoyancy device 20 is lowered into the water 6, a hydrostatic water pressure on the wall of the buoyancy device 20 increases, and may become very high. For this end, the buoyancy device 20 may be completely filled with water.

It is also possible to connect the connecting organ 28 to the anchoring device 26 prior to connecting the coupling device 42 to the connecting organ 28. In this case, the first coupling device 42 may comprise a pipeline coupling part (not shown) connected to the pipeline 10 and a first mating part (not shown) connected to the connecting organ 28, such that the first mating part can be coupled to the pipeline coupling part, when the pipeline coupling part engages the first mating part. For instance, the first mating part may be a clamp laying in an open position on the seabed. The pipeline coupling part may be a collar or a different protrusion fixed to the pipeline and extending outwardly from the pipeline 10. When the pipeline 10 is laid on the clamp, the clamp is closed, substantially surrounding the pipeline. The collar is positioned between the clamp and the touch-down point 18. When the pipeline 10 is moved upward, the pipeline 10 slides through the clamp and the collar engages the clamp. The pipeline 10 is thus prevented from moving further upward relative to the clamp. The connecting organ 28 is pulled taut and the target position of the pipeline assembly 1 is achieved. The first mating part may also be a hook, adapted to hook onto an eye provided on one end of the connecting organ 28.

Turning to FIGS. 2c1-2c3 and 2d1-2d3, a series of steps I-VI is shown, wherein the buoyancy device 20 is connected to the delivery end 36 of the pipeline 10 at the pipeline laying vessel 40, and wherein the buoyancy device 20 is subsequently lowered from the pipeline laying vessel 40 during step II for coupling the connecting organ 28 to the first coupling device 42 and the anchoring device 26. Preferably, the buoyancy device 20 comprises a pressure system for ballasting or deballasting the buoyancy device 20. During steps I and II, the buoyancy device may be substantially ballasted in order to reduce the buoyancy force.

In step III, the connecting organ 28 is coupled to the anchoring device 26 and the first coupling device 42. The connection may be performed by an ROV (not shown).

In steps IV, V and VI, the delivery end 36 and the buoyancy device 20 are moved to the delivery end target location 118. The buoyancy device 20 is deballasted, to provide the lifting force for the pipeline 10 to be suspended.

FIGS. 2e, 2f and 2g show a first coupling device 42 having an opening 134 at an upper side thereof 135. The first coupling device 42 comprises rollers 62 which allow a movement of the pipeline 10 relative to the first coupling device 42 in the direction of the longitudinal axis 69 of the pipeline 10. The rollers 62 taper outwards from the center toward the respective ends 137 thereof, for providing lateral support.

In operation, a pipeline 10 may be lowered onto the first coupling device 42 in the direction of arrow 136. Side supports 138 also provided for guiding a pipeline 10 in the required position, for supporting the pipeline 10 in a lateral direction.

In FIG. 2f, a coupling organ 140 is moved toward the first coupling device 42, and connected thereto, for connecting the first coupling device 42 around the pipeline 10. The coupling organ 140 is installed by an ROV 142. The ROV may be suspended from a surface vessel by a suspension 151 or self-floating. The coupling organ 140 may also be suspended from a crane on a surface vessel (not shown) in such a way that the ROV substantially controls the horizontal position of the coupling organ 140 and the vertical position of the coupling organ 140 is controlled by the crane.

The first coupling device 42 is movably connected to the pipeline 10 in the direction of the longitudinal axis.

It is also possible to provide a first coupling device 42 which is configured to be laid on the seabed 14 in a substantially open position, and is configured to couple substantially automatically to a pipeline 10 when the pipeline 10 is laid on top of the first coupling device 42 by the downward force of the pipeline 10 on the first coupling device 42. This may be achieved by two or more gripping parts, which are movable relative to one another and substantially grip the pipeline 10. An ROV is thus not necessary.

Turning to FIGS. 2i, 2j, 2k, 2l and 2m, a series of steps for installing the pipeline assembly 1 is shown. In FIG. 2i, the anchoring device 26 is installed with a connecting organ 28 coupled thereto. In FIG. 2j, the first coupling device has been provided and connected to the connecting organ 28. The pipeline 10 is laid on the first coupling device 42, in particular on the rollers 62, and the pipeline 10 extends adjacent the anchoring device 26. The pipeline 10 is provided with a collar device 144. Subsequently, the coupling organ 140 is provided on the first coupling device 42.

In FIG. 2k, the first coupling device 42 is connected to the pipeline 10 and ready to be lifted from the seabed 14. The connecting organ 28 is connected to the first coupling device 42 by the ROV. In FIG. 2l, the pipeline 10 is moved upward. The first coupling device 42 rotates about the longitudinal axis 69 of the pipeline 10, such that the rollers 62 are positioned at an upper side of the pipeline 10. The collar device 144 will be moved relative to the first coupling device 42 until the collar device 144 abuts the first coupling device 42.

In FIG. 2m, the pipeline 10 has reached its target position. The collar device 144 abuts the first coupling device 42, and the connecting organ 28 is pulled taut. The upward force 146 of the pipeline 10 is diverted via the collar device 144 and the first coupling device 42 to the connecting organ 28, and via the connecting organ 28 and the anchoring device 26 to the seabed 14.

Turning to FIGS. 3a and 3b different embodiments of the first coupling device 42 are shown. The first coupling device 42 may be a clamp, as is shown in FIG. 3a, which is bolted by bolts 60 around the pipeline 10. The clamp may be fitted around the pipeline 10 completely or partially, for instance by gripping the pipeline 10 from two opposing sides. The connecting organ 28 may be connected to the first coupling device 42 in such a way, that it is freely rotatable relative to the first coupling device 42, without exerting a substantial bending moment on the pipeline 10. Thus, the angle α shown in FIGS. 3a and 3b may vary. The pipeline 10 itself extends at an angle β relative to a vertical axis 73.

In FIG. 3b, an embodiment of the first coupling device 42 is shown having rollers 62, which enable the first coupling device 42 to move relative to the pipeline 10 in a direction parallel to a longitudinal axis 69 of the pipeline 10, as shown by a double arrow 63. In this way, the first coupling device 42 may choose its own preferred position when the pipeline assembly 1 is installed.

FIGS. 3c and 3d show another embodiment of the first coupling device 42, wherein projections 64 extend substantially horizontally from the first coupling device 42 along a horizontal axis 67 which intersects the longitudinal axis 69 of the pipeline 10. A force is transferred from the connecting organ 28 to the pipeline 10 at a force transfer point located substantially on the horizontal axis 67. The connecting organ 28 is coupled to the projections 64 and is able to rotate about projections 64. In this way, the connecting organ 28 may rotate relative to the pipeline 10, without exerting a bending movement on the pipeline 10.

The first coupling device 42 is thus configured to transfer a force from the connecting organ 28 to the pipeline 10 at least one force transfer point 77 located on a substantially horizontal axis 67 extending through the longitudinal axis 69 of the pipeline 10, wherein the horizontal axis 67 extends substantially perpendicular to a vertical plane in which the pipeline 10 extends.

Turning to FIGS. 4a and 4b, an embodiment of the connecting device 27 according to the invention is shown, wherein the connecting device 27 is configured to guide the pipeline 10 along a predetermined trajectory, which is in part curved. For this end, the connecting device 27 comprises a pipeline shaping device 65, which defines the curved trajectory. The curvature of the trajectory is such, that the pipeline 10 is substantially plastically deformed.

The connecting device 27 is connected to the anchoring device 26. The connecting device 27 comprises a contact surface 66, which, when viewed from the side, as is shown in FIG. 4b, is curved and has substantially a form of a quarter circle. The contact surface 66 need not be exactly circular. When viewed from the front, the contact surface 66 has a substantial U-shape which is turned upside down and comprises a first ridge 68a and a second ridge 68b which define a gutter-like form 70. The gutter 70 supports the pipeline 10 in a horizontal direction when horizontal forces are exerted on it, as is indicated by double arrow 72. The position of the curved section 15 is thus fixed in the direction of arrow 72.

The connecting device 27 may also be indicated as a bending bench, because the pipeline 10 is bent around the connecting device 27, and a curved section 15 of the pipeline 10 is formed. The gutter 70 is configured to exert a downward force on the pipeline 10, preventing the pipeline 10 from moving upward by an upward force 74 exerted on the pipeline by the buoyancy device 20, and thus keeping the pipeline 10 in a fixed vertical position.

A vertical clearance 76 is provided between the pipeline shaping device 65, in particular between ridge 68a, and the seabed 14. The clearance 76 enables the pipeline 10 to be moved horizontally from a first position adjacent the connecting device 27 to a second position substantially under the contact surface 66, as will be further explained hereinafter.

A locking device 78 may be provided for substantially locking the pipeline 10 in its position.

FIGS. 5a1-5a4 and 5b1-5b6 show a method of installing a pipeline assembly 1 comprising the connecting device 27 of FIGS. 4a and 4b. In subsequent steps I through IX. In step I, the pipeline 10 is laid by the pipeline-laying vessel 40.

In step II, the pipeline 10 has reached its target length, and the delivery end 36 of the pipeline 10 is lowered from the pipeline-laying vessel 40 by an A&R-device 54. The pipeline-laying vessel 40 is moved in the direction of arrow 50, and as shown in steps III and IV, the pipeline 10 is fully laid on the seabed 14. It may also not be necessary to lay the pipeline 10 completely on the seabed 14. In this case, the pipeline 10 is held in the position shown in step III, and subsequently moved upward, as is shown in step VII. Steps V and VI may thus be skipped.

The A&R-device 54 may alternatively be disconnected from the pipeline 10, as is shown in step V. Subsequently, the anchoring device 26 and the connecting device 27 may be provided, for instance by the pipeline laying vessel 40, which is moved to a location 56 substantially above the target location of the anchoring device 26. It is possible that in step V, the connecting device 27 is positioned directly above the pipeline 10. In this way, the pipeline 10 may subsequently be raised without a need of moving the pipeline 10 horizontally. However, it is also possible to install the connecting device 27 at a location alongside the pipeline 10. Then, the pipeline 10 is to be moved laterally to a position under the connecting device 27, for which purpose the clearance 76 is provided between the pipeline shaping device 65 and the seabed 14.

However, it is also possible to pre-install the anchoring device 26 and the connecting device 27. The connecting device 27 may be installed by a second auxiliary vessel (not shown). In this case, the pipeline can not be positioned under the connecting device 27 in step III, and the horizontal movement is to be carried out as described above. The anchoring device 26 and the connecting device 27 may be pre-assembled into one construction, and subsequently positioned at the seabed 14. It is also possible to assemble the anchoring device 26 and the connecting device 27 at the seabed 14.

In step VI, it is shown that the delivery end 36 of the pipeline 10 is raised from the seabed 14 by the pipeline vessel 40 with the use of the A&R-device 54. The connecting device 27 is provided near the seabed 14, and anchored to the seabed 14 by an anchoring device 26. The delivery end 36 of the pipeline 10 is moved upwards and moved horizontally toward a location above the connecting device 27.

In step IX, the pipeline 10 engages the contact surface 66 of the connecting device 27, and is plastically deformed by the contact surface 66, in such a way that a curved section 15 having a relatively small radius 32 is formed. The plastic deformation is achieved by the moving of the pipeline laying vessel 40 relative to the seabed 14. The delivery end 36 is moved by the pipeline laying vessel 40.

As is shown in step IX, it may be necessary to move the delivery end 36 over a distance 119 beyond its delivery end target position 118, thereby bending the pipeline 10 slightly more than is required in the target position. This allows some relaxation of the curved section 15 of the pipeline 10, thereby decreasing tensions in the pipeline wall in the curved section 15 in the target position. The buoyancy device 20 may be connected to the delivery end 36 in step X, or may have been connected to the delivery end 36 of the pipeline previously, for instance in step I.

A lock device 78 may be provided in order to lock the pipeline 10 in its target position.

Turning to FIGS. 5c1-5c4, 5d1-5d3, 5e and 5f, an embodiment of the invention is shown, wherein the buoyancy device 20 is connected to the pipeline 10 in step I. In the same way as in the method of FIGS. 2c and 2d, the buoyancy device 20 is lowered to a predetermined depth 99 and subsequently moved to the delivery end target location 118.

In step I, the anchoring device 26 and the pipeline shaping device 65 are installed on the seabed 14. In step II, the buoyancy device 20 is connected to the delivery end 36. In steps III and IV, the pipeline 10 is laid adjacent the pipeline shaping device 65. The buoyancy device is lowered to a predetermined depth 99. The buoyancy device 20 may be partly or completely ballasted. In step V, the pipeline 10 is moved horizontally in order to position a part of the pipeline 10 underneath the pipeline shaping device 65. In steps VI and VII, the delivery end 36 is moved toward the delivery end target location 118 in substantially the same way as in steps VI-X of FIG. 5b, thereby bending the pipeline 10 around the pipeline shaping device 65.

Turning to FIGS. 5e, 5f and 5g, an embodiment of the buoyancy device 20 is shown, wherein the buoyancy device 20 is elongate and provided substantially around the pipeline 10, near the delivery end 36 thereof. The delivery end 36 protrudes from the upper side 148 of the buoyancy device 20.

A delivery end coupling device 150 is provided at the delivery end 36, to which an A&R device 54 may be coupled. An arcuate connector 108 is provided in order to connect an end of the flexible connecting pipeline 34 to the delivery end 36.

In FIG. 5g, the buoyancy device 20 is provided with a recess 152, which allows easy coupling and decoupling of the buoyancy device 20 with the pipeline 10, for instance after the pipeline 10 is positioned in its target position. A stop device 154 in the form of a collar is provided on the pipeline 10, for engaging the buoyancy device 20 and bearing an upward force of the buoyancy device 20 on the pipeline 10.

Turning to FIGS. 6 and 7, an embodiment of the pipeline assembly 10 is shown, comprising a curvature limiting device 82. The curvature limiting device 82 is fitted substantially around the pipeline 10, and extends for a predetermined length along the pipeline 10. The curvature limiting device 82 comprises a series of interconnected elements 84a . . . 84l fitted substantially around the pipeline 10, the elements 84a . . . 84l being pivotably connected to one another. A pivot angle of one element relative to a next element is limited. Such a curvature limiting device 82 is known in the field of the art.

Instead of a curvature limiting device comprising a series of interconnected elements 84a . . . 84l, it is also possible to apply a thick walled pipe section around the pipeline 10 having stress joint transitions as is shown in FIGS. 9a and 9b.

The curvature limiting device 82 ensures that the pipeline 10 cannot be bent further than an elastic deformation allows. It is thus ensured that the pipeline 10 is substantially free of tensions beyond the elastic limit and thus free of plastic deformations. A typical elastic curvature radius 32 is 300 times the external diameter of the pipeline 10. Alternatively, the curvature limiting device 82 may limit the curvature of the pipeline 10 to a predetermined maximum plastic deformation.

In the target position, the curvature limiting device 82 extends substantially horizontally at the seabed 14 and curves upwards, to a point 86 where the curvature limiting device 82 and the pipeline 10 extend substantially vertically. Here, the first coupling device 42 is provided. A connecting organ 28 connects the first coupling device 42 to the anchoring device 26. The connecting organ 28 may be a cable or a chain or a rod.

An anchoring coupling device 48 is provided for coupling the connecting organ 28 with the anchoring device 26.

FIGS. 7a-7e show a method of installing the connecting organ 28 of FIG. 6. Prior to step 1, the curvature limiting device 82 has been fitted around the pipeline 10 at the pipeline laying vessel 40. Also, the first coupling device 42 is installed at the pipeline laying vessel 40.

In step I, the pipeline laying vessel 40 supports the delivery end 36 of the pipeline 10 at a certain depth. It is generally not necessary to fully lay down the pipeline 10 on the seabed 14. The pipeline laying vessel 40 subsequently moves in the direction of arrow 58, thereby positioning the riser section 16 substantially upright.

In step II, the coupling device is positioned directly above the anchoring device, and the pipeline adopts its target position and form. In step IV, the rod 28 is provided between the first coupling device and the anchoring device 26.

In step V, a buoyancy device 20 is connected to the delivery end 36. The A&R device 54 may then be disconnected from the delivery end 36. As in the embodiment of FIGS. 2a and 2b, the buoyancy device 20 may also be connected to the pipeline when the delivery end 36 is supported at the water surface 4 by the pipeline laying vessel 40.

Turning to FIGS. 8a, 8b, 8c, 8d1-8d3 and 8e1-8e4, an embodiment is shown wherein a pipeline shaping device 65 is provided which is configured to provide a curvature of the pipeline which is relatively large, thereby elastically deforming the pipeline 10. The pipeline shaping device 65 defines a curved target trajectory of the pipeline 10, which substantially forms a quarter of a circle.

A typical radius of the curved trajectory is at least 300 times the external diameter 71 of the pipeline 10. This implies that the connecting device 27 may have a length 92 and height 94 in the order of 50 to 100 meter, depending on the diameter of the pipeline 10.

The pipeline shaping device 65 has a contact surface in the form of a substantial U-shape, defined by ridges 68a, 68b for supporting the pipeline 10 in a lateral direction. A first end 88 of the pipeline shaping device 65 extends substantially horizontally, and a second end 89 extends substantially vertically.

The pipeline shaping device 65 is anchored to the seabed 14 at at least two anchoring points 26a, 26b.

Figure 8A:
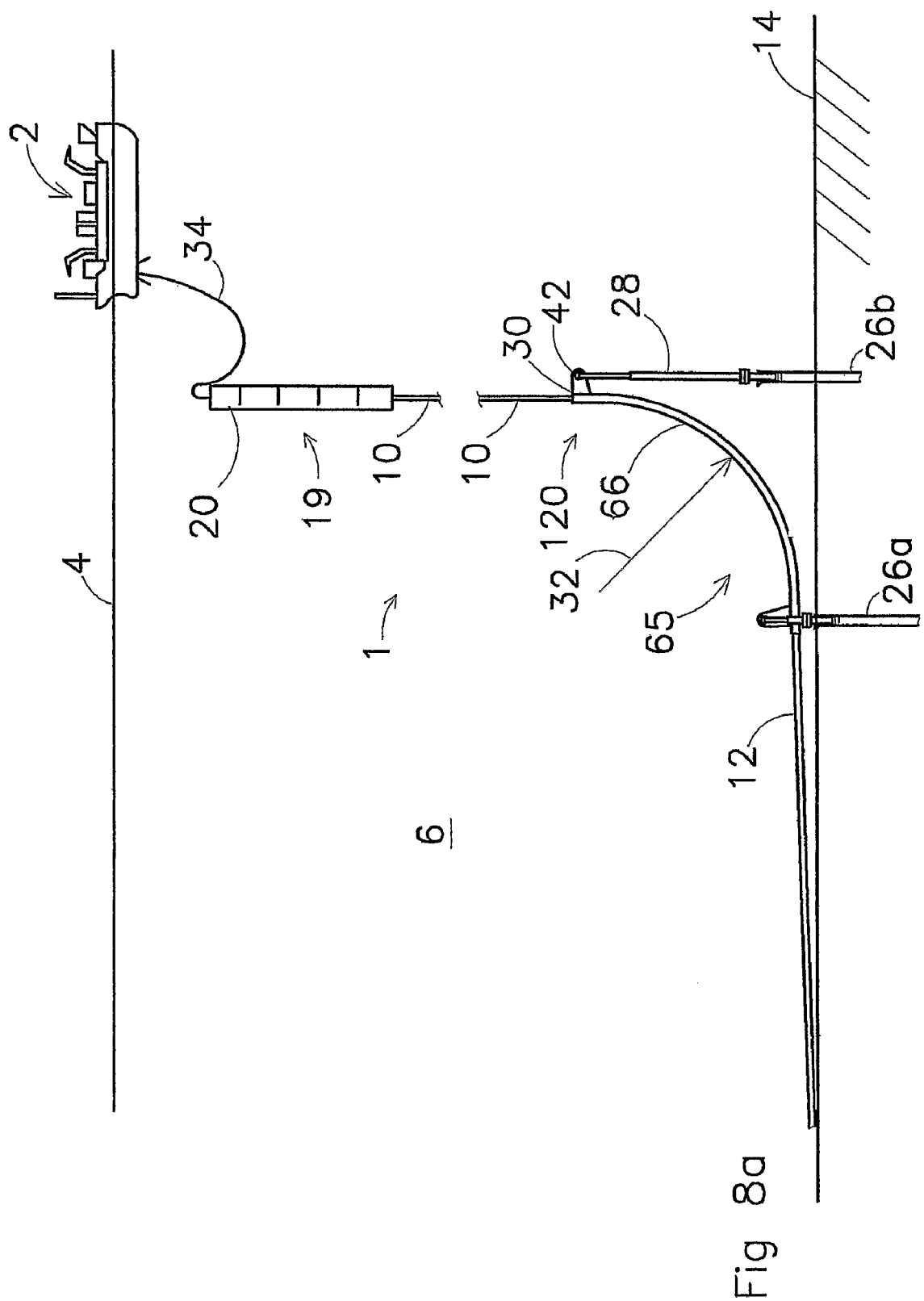
FIG. 8a shows a schematic side view of an embodiment of the pipeline assembly according to the invention.

In FIGS. 8d1-8d3, 8e1-8e4, a method of installing the pipeline 10 of FIGS. 8a, 8b and 8c is shown. In a first step I, the pipeline shaping device 65 is connected to anchoring device 26a, 26b provided at the seabed 14. In a subsequent step II, the pipeline 10 is laid by the pipeline laying vessel 40, or by an auxiliary vessel. In step III, the pipeline 10 is positioned underneath the pipeline shaping device 65, which may require a lateral movement. This lateral movement may be performed by moving the pipeline laying vessel 40 sideways, perpendicularly to a vertical plane in which the pipeline 10 extends.

In step IV, the pipeline laying vessel is disconnected from the pipeline 10. This step may be optional. In steps V and VI, the pipeline laying vessel 40 moves the delivery end 36 upward, by decreasing the length of the A&R-device 54. At the same time the pipeline laying vessel moves in the direction of arrow 58.

In step VII, the pipeline laying vessel 40 is positioned substantially above the connecting device 27, and the pipeline 10 has adopted it target position. The pipeline 10 engages the contact surface 66 of the pipeline shaping device 65, and the pipeline 65 is bent substantially in the form of a quarter circle, such that a curved section 15 is formed between a seabed section 12 and a substantially vertical section 17. A lock device 78 may be provided to secure the pipeline 10 in an engaging position with the pipeline shaping device 65. A flexible connecting pipeline 34 may be connected after installation of the buoyancy device 20. It is also possible to connect the flexible connecting pipeline 34 to the buoyancy device above the water surface 4 and subsequently connect the buoyancy device with the flexible connecting pipeline 34 to the delivery end 36.

Turning to FIGS. 9a and 9b, an embodiment of a curvature limiting device is shown, having a thick walled pipe section 96 comprising tapered transition sections 98. The thick walled pipe section 96 is configured to function as a curvature limiting device 82, and ensures a minimum value of the curvature radius 32, as can be seen in FIG. 9b. The curvature limiting device 82 comprises a pipeline part 96 having a wall thickness which is at least in part greater than a wall thickness of the pipeline 10.

Turning to FIG. 10, an embodiment of the invention is shown wherein a plurality of pipelines 10 extend between a seabed 14 and their respective delivery ends 36 near the water surface 4. Each delivery end 36 is connected to the target device by a respective connecting pipeline 34.

The target device 2 is anchored to the seabed 14 by mooring lines 100. The mooring lines 100 may be grouped together in respective groups 101a, 101b. The mooring lines 100 support the target device 2 in a horizontal direction and substantially fix the position of the target device 2.

Several groups of mooring lines 101a, 101b may extend between the seabed 14 and the target device 2, leaving only a relatively narrow corridor of space available for the pipelines 10 to extend from the seabed 14 to a required position near the water surface 4.

If the pipeline 10 is connected to the seabed 14 according to any of the embodiments disclosed hereinabove, the delivery ends 36 of the pipelines 10 may move relative to one another under the influence of water currents or due to forces exerted on the delivery ends 36 by the flexible connecting pipelines 34. In such a case, there may be a risk that the pipelines 10 hit one another. There may also be a risk of a pipeline 10 hitting a mooring line 100.

In order to reduce the movements of the pipelines 10, an inter-pipeline connecting device 102 between a first and a second pipeline 10, in particular between the respective delivery ends 36 thereof, may be provided. The inter-pipeline connecting device 102 may also be connected to the pipelines 10 at a point below the delivery end. The inter-pipeline connecting device 102 can be a line or a cable having a substantial mass, which pulls a first and a second delivery end 36 toward one another over a distance 204. A pre-stress is thus provided on the inter-pipeline connecting device 102, which is dependent on the lateral movement of the respective buoyancy devices. If the buoyancy devices 20 move toward one another, the pulling force decreases, and if the buoyancy devices 20 move away from one another, the pulling force increases. In this way, an equilibrium will be attained.

The inter-pipeline connecting device 102 may be provided in combination with any of the connecting devices 27 disclosed hereinabove. The result of the inter-pipeline connecting device 102 is that the total horizontal stiffness of the pipeline device 122 is increased and that the horizontal movements of the delivery ends 36 are substantially reduced. This reduces the risk of collision of the pipelines 10 with one another and with the mooring lines 100.

A plurality of delivery ends 36 may be interconnected by respective inter-pipeline connecting devices 102, for instance in a closed loop formation comprising three or more delivery ends 36.

Turning to FIGS. 11a, 11b, 11c and 11d, it is also possible that a substantially rigid connecting device 103 is provided. The rigid connecting device 103 may be a horizontal beam or rod or have a different configuration. The inter-pipeline connecting device 103 may be substantially rigidly connected to the first and second pipeline (10). Each buoyancy device 20 may support one end of the rigid connecting device 103 by a respective console 104.

The pipeline 10 may extend through the buoyancy device 20, which may have the form of a cylinder. Connectors 108 may be provided between each pipeline 10 and a connecting pipeline 34, the connectors 108 having opposite ends 109,111 which project substantially downwards. The connecting pipeline 34 is suspended from the end 109.

One or more additional pipelines 10 may be suspended from the rigid connecting device 103. This additional pipeline 10 may also be anchored to the seabed 14 by a connecting device 27. It is also possible to connect other lines, such as one or more umbilicals or a flexible riser 106 to the rigid connecting device 103. In this case, the total buoyancy of the respective buoyancy devices 20 should be sufficient for supporting all the pipelines which are suspended from the support device 19. Extra buoyancy may be provided at the installation of the buoyancy device 20 or at later instant, for instance when the rigid connecting device 103 is installed or when a flexible riser 106 or umbilical is suspended from the rigid connecting device 20.

Figure 11D:
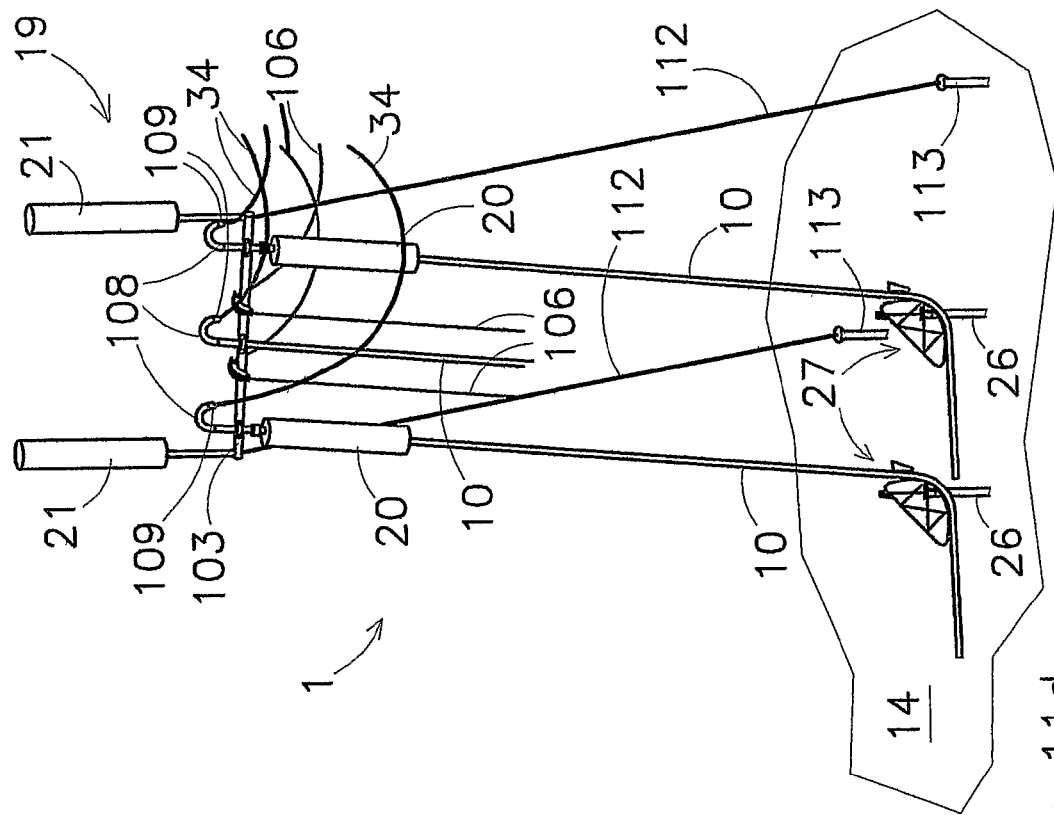
FIG. 11d shows a schematic axonometric view of another embodiment of the pipeline assembly.
Figure 11C:
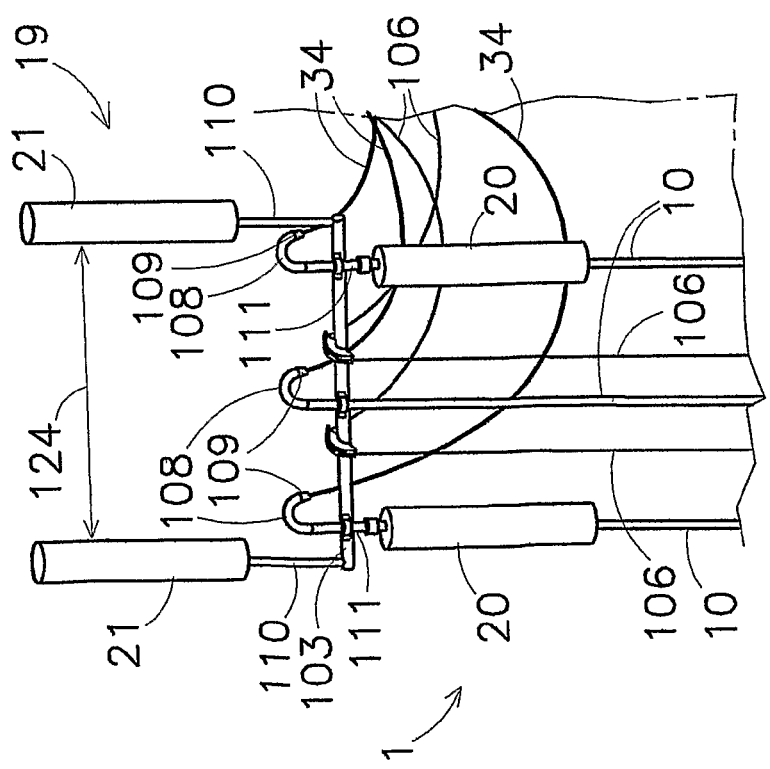
FIG. 11c shows a schematic axonometric view of another embodiment of the pipeline assembly.

In FIG. 11c and 11d a support device 19 is shown wherein additional buoyancy devices 21 are provided, which are connected to the rigid connecting device 103 by respective connection means 110, in the form of a chain, wire or tendon. The additional buoyancy devices 21 have a cylindrical form, extending substantially upright. Other forms of the buoyancy device 21 are also possible.

In FIG. 11d it is shown that the rigid connecting device 103 may be anchored to the seabed 14 by anchoring lines 112, which are each connected to an anchoring means 113. This provides additional stiffness to the pipeline assembly 1 and further reduces horizontal and vertical movements of the pipeline assembly.

Figure 12A:
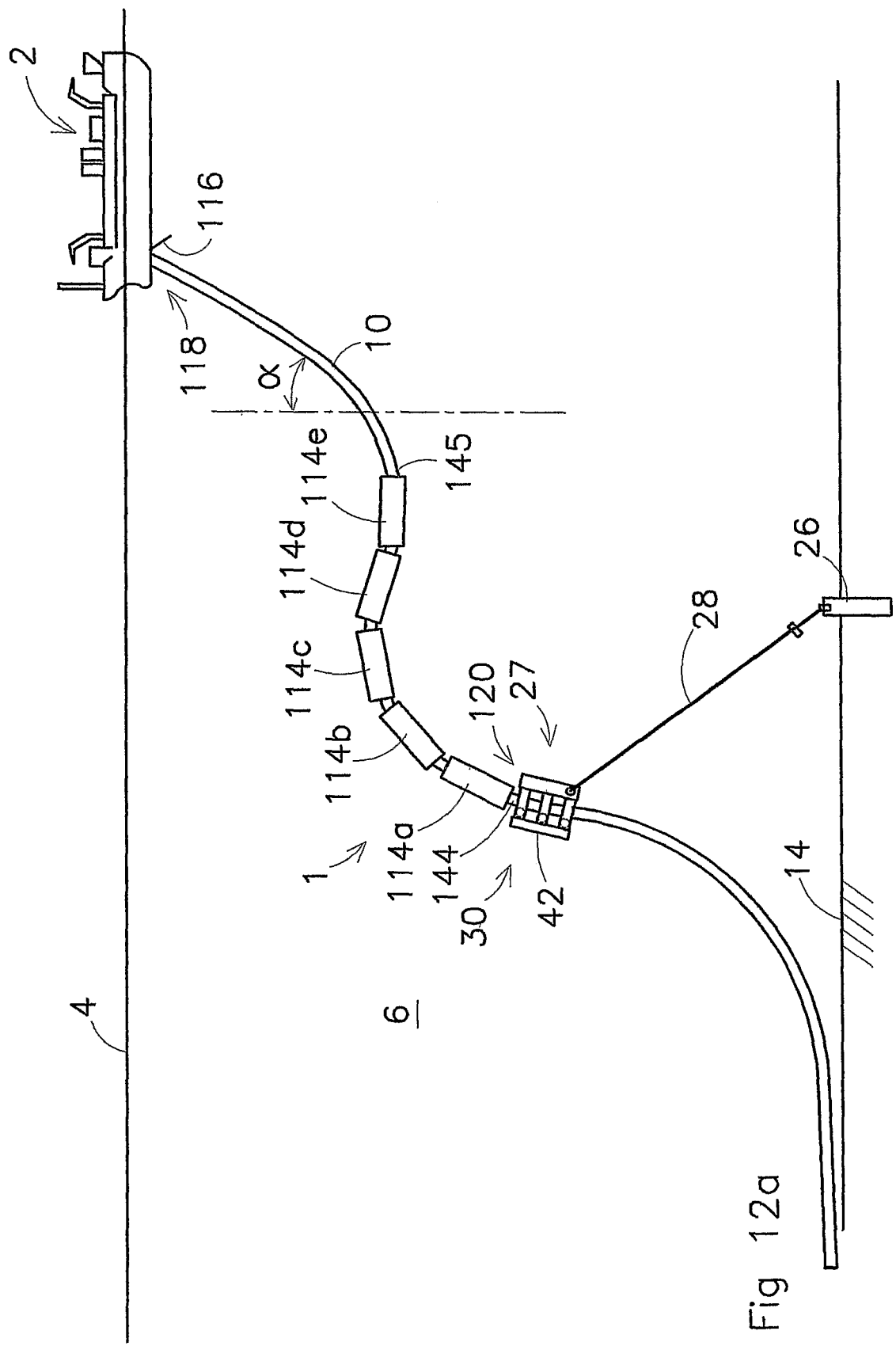
FIG. 12a shows a schematic side view of another embodiment of the pipeline assembly of the invention.
Figure 12B:
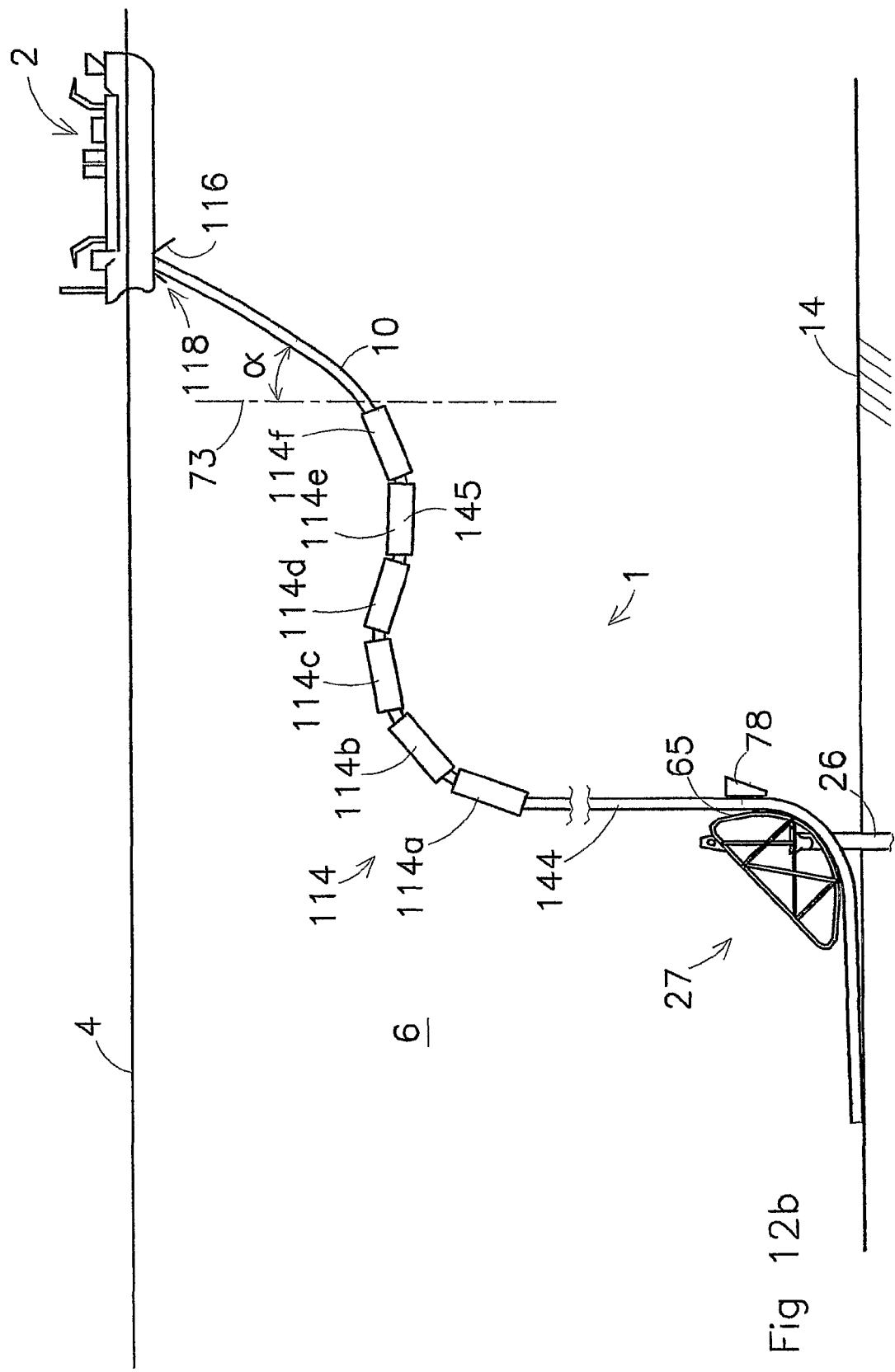
FIG. 12b shows a schematic side view of yet another embodiment of the pipeline assembly according to the invention.

FIGS. 12a, 12b show an embodiment of the invention, wherein the pipeline 10 is provided with a series of buoyancy devices 114a . . . 114f at a certain depth. Such a configuration is known in the field of the art as a lazy wave. The pipeline 10 extends at an angle α to a vertical axis 73, wherein the angle α first decreases from the coupling point 30 in an upward direction along a part of the pipeline 10 until a first turning point 144, then increases until a second turning point 145 and then decreases again until the target device coupling point 118. The lazy wave may be provided at a relatively large depth, known as a low lazy wave, or at a relatively small depth.

The pipeline assembly 1 is connected to the seabed 14 with a connecting device 27 as described hereinabove. The connecting device 27 may comprise a coupling device 42 and a connecting organ 27, but may also comprise a pipeline shaping device 65 for plastically bending the pipeline 10, as shown in FIG. 12b or a curvature limiting device 82 (not shown). It is also possible to provide a pipeline shaping device 65 for elastically bending the pipeline 10 (not shown).

Figure 13:
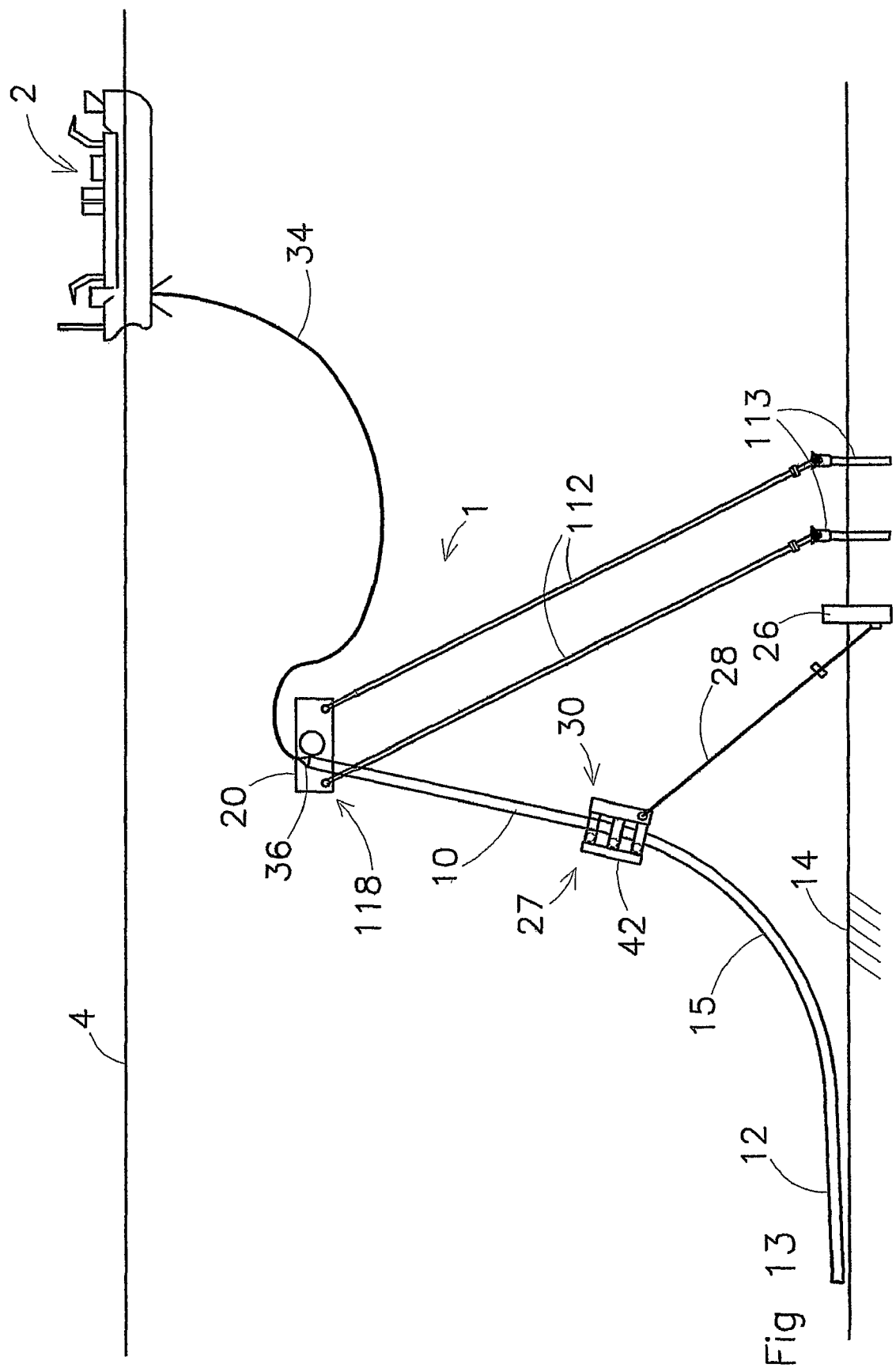
FIG. 13 shows a schematic side view of an embodiment of the pipeline assembly according to the invention.

FIG. 13 shows a pipeline assembly 1 comprising a buoyancy device 20 anchored to the seabed 14 by two anchoring means 113 and two associated tendons 112. A connecting device 27 comprising a coupling device 42 and a connecting organ 28 is connected at a coupling point 30 to the pipeline 10. Movements of the delivery end 36 are thus substantially reduced, and movements of the curved section 15 are also substantially reduced.

Figure 14:
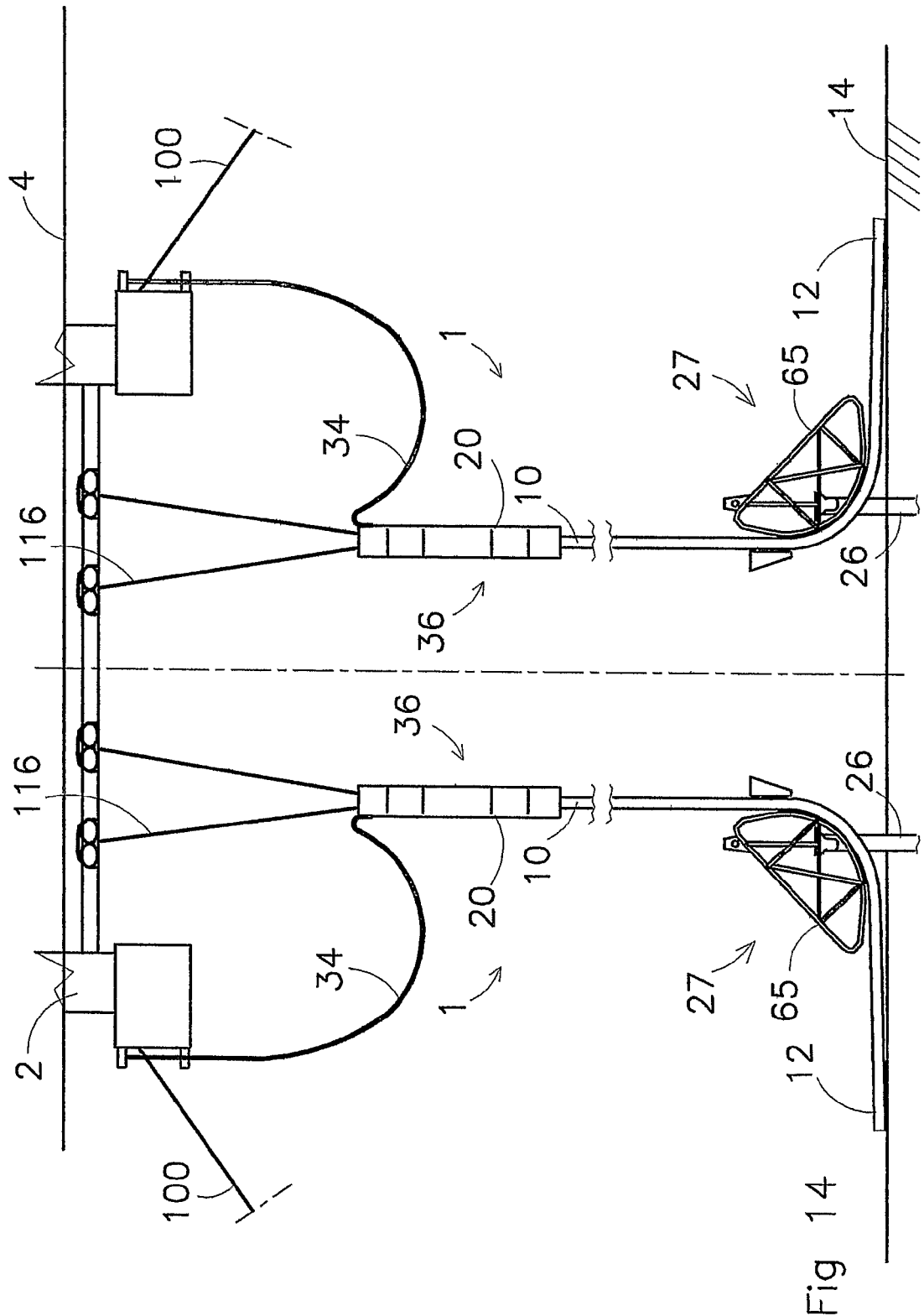
FIG. 14 shows a schematic side view of another embodiment of the pipeline assembly according to the invention.

FIG. 14 shows an embodiment of the pipeline assembly 1 comprising a pipeline 10 which is coupled to the target device 2 by a target device coupling means 116. Two similar pipeline assemblies 1 are shown, each connected to a common target device 2. The target device coupling means 116 couples the delivery end 36 of the pipeline assembly to the target device 2, ensuring that the delivery end 36 moves together with the target device 2 in case of horizontal movements of the target device 2. The target device coupling means 116 allows a limited vertical movement of the delivery end 36 relative to the target device 2.

The target devices 2 can be a semi-submersible, a TLP, a barge or a spread or turret moored FPSO. The target device 2 may also be positioned by dynamic positioning.

The delivery end 36 may be positioned closer to the target device 2, allowing a shorter connecting pipeline 34.

FIG. 15 shows an embodiment of the invention comprising a pipeline 1 having a delivery end 36 which is connected directly to the target device 2. The target device 2 itself provides the buoyancy for supporting the delivery end 36. The anchoring of the pipeline 10 according to the invention will reduce the fatigue at the touch-down point 18 with the seabed. The target device 2 is moored to the seabed by mooring lines 100.

A person skilled in the art will appreciate that this embodiment is particularly suitable in conditions wherein the target device has a limited heave motion, such as in areas having nice weather and only small waves, and for a target device having a restricted heave motion, such as a Tension Leg Platform and a Spar.

FIGS. 16a and 16b show a support device 19 comprising a buoyancy device 20. The delivery end 36 of the pipeline 10 ends at a distance 127 below the buoyancy device 20. The flexible connecting pipeline is connected to the delivery end 36 under the buoyancy device 20. A connector 128 having a substantially arcuate form connects the delivery end 36 with the connecting pipeline 34 for providing a fluid connection therebetween. The connector 128 has a first end 130 which is oriented substantially vertically in a downward direction 143, to which first end 130 the delivery end 36 is connected. The connector 128 has a second end 132 which is also oriented in a substantially downward direction 136. The direction 136 may also have a horizontal component 141. The buoyancy device 20 is connected to the delivery end 36 of the connector 128 by a buoyancy connecting device 126, and positioned above the delivery end 36.

It will be obvious to a person skilled in the art that numerous changes in the details and the arrangement of the parts may be varied over considerable range without departing from the spirit of the invention and the scope of the claims.

What is claimed is:

1. A method of installing a pipeline assembly in the form of a catenary riser having a substantial J-shape, the method comprising:
  a) laying a pipeline at least partly on a seabed by a pipeline laying vessel, the pipeline being substantially rigid, the pipeline comprising a curved section which curves upwardly from the seabed, the pipeline extending to a delivery end of the pipeline which is supported by the pipeline laying vessel;
  b) providing at least one anchoring device at the seabed;
  c) connecting the pipeline at a coupling point to the at least one anchoring device by at least one elongate connecting organ after the anchoring device is provided at the seabed, by performing either step c1) or c2),
  step c1) comprising:
    coupling one end of the elongate connecting organ to the pipeline at the coupling point when the coupling point is near the pipeline laying vessel,
    lowering the pipeline with the coupling point and the elongate connecting organ such that an opposite end of the elongate connecting organ is moved to the anchoring device by maneuvering the pipeline with the pipeline laying vessel; and
    coupling the opposite end of the elongate connecting organ with the anchoring device at the seabed by engaging the opposite end against a mating part of the anchoring device;
  step c2) comprising:
    coupling one end of the elongate connecting organ to the anchoring device and laying the elongate connecting organ on the seabed, an opposite end of the elongate connecting organ being provided with a mating part which is also laid on the seabed,
    moving the coupling point on the pipeline to the mating part of the elongate connecting organ on the seabed by maneuvering the pipeline with the pipeline laying vessel, coupling the coupling point to the mating part of the elongate connecting organ on the seabed, and moving the coupling point upward by maneuvering the pipeline with the pipeline laying vessel, thereby lifting the elongate organ from the seabed;

wherein the elongate connecting organ is configured for substantially limiting an upward movement of the coupling point, d) positioning the delivery end at a delivery end target position;

e) supporting the delivery end by a support device, and f) disconnecting the pipeline from the pipeline laying vessel.

2. The method of claim 1, wherein:

step c1) comprises: engaging the opposite end of the elongate organ against the mating part of the anchoring device by maneuvering the pipeline with the pipeline laying vessel;

or step c2) comprises: engaging the coupling point against the mating part of the elongate connecting organ by maneuvering the pipeline with the pipeline laying vessel.

3. The method of claim 1, wherein in step c1) the mating part of the anchoring device comprises an eye or a receptacle for a ballgrab connector and wherein a hook or a ballgrab connector is connected to the opposite end of the elongate connecting organ and wherein step c1) comprises:

coupling the hook or ballgrab connector to the eye or to the receptacle for the ball-grab connector, or wherein in step c2) a hook is provided at the coupling point and the mating part at the opposite end of the elongate connecting organ comprises an eye, and wherein step c2) comprises coupling the hook to the eye.

4. The method of claim 1, wherein step c2) is performed and wherein step c2) comprises:

laying the mating part of the elongate connecting organ on the seabed, laying the coupling point on top of the mating part of the elongate connecting organ by maneuvering the pipeline by the pipeline laying vessel, thereby connecting the coupling point substantially automatically to the mating part by of the elongate connecting organ a downward force of the pipeline on the mating part of the elongate connecting organ.

5. The method of claim 4, wherein step c2) is performed and wherein in step c2) the mating part of the elongate connecting organ comprises a clamp and wherein a collar or a protrusion is fixed to the pipeline at the coupling point and extends outwardly from the pipeline, and wherein step c2) comprises:

laying the clamp in an open position on the seabed, laying the pipeline on the clamp, and closing the clamp such that the pipeline is substantially surrounded.

6. The method of claim 5, wherein step d) comprises:

moving the pipeline upward such that the pipeline slides through the clamp, and the collar or the protrusion engages the clamp, thereby preventing the pipeline from moving further upward relative to the clamp and pulling the elongate connecting organ taut.

7. The method of claim 1, comprising pre-installing the elongate connecting organ with the anchoring device, and coupling the pipeline with the connecting organ during step (c).

8. The method of claim 1, wherein the anchoring device is provided on the seabed by the pipeline laying vessel while laying the pipeline when the vessel is positioned substantially above a target location of the anchoring device.

9. The method of claim 1, wherein the method is carried out by a single vessel.

10. The method of claim 1, wherein the maneuvering of the pipeline by the pipeline laying vessel relative to the anchoring device comprises laying a further section of pipeline by the pipeline laying vessel.

11. The method of claim 1, comprising installing a first pipeline assembly and a second pipeline assembly, and connecting the first and second pipeline assemblies to one another by an inter-pipeline connecting device at a substantial distance from the seabed.

12. The method of claim 1, wherein step d) comprises positioning the pipeline such that at the coupling point a longitudinal axis of the pipeline extends at an angle of less than ten degrees, in particular less than five degrees, to a vertical axis.

13. The method of claim 1, wherein step d) comprises positioning the pipeline such that the connecting organ extends at an angle of less than ten degrees, in particular less than five degrees to a vertical axis.

14. The method of claim 1, wherein the maneuvering of the pipeline with the pipeline laying vessel comprises lowering the delivery end from the pipeline laying vessel while moving the pipeline laying vessel away from the anchoring device, and wherein the positioning of the delivery end at the delivery end target position of step d) comprises lifting the delivery end toward the pipeline laying vessel while moving the pipeline laying vessel toward a position substantially above the anchoring device.

15. The method of claim 1, wherein the pipeline is arranged such that the angle between a longitudinal axis of the pipeline and a vertical axis decreases when viewed along the pipeline from a touch down point to the coupling point.

16. The method of claim 1, wherein the coupling point is positioned at 300-900 meter above the seabed.

17. The method of claim 1, wherein the coupling point is positioned at 600-800 meter above the seabed.

18. The method of claim 1, comprising coupling at least one buoyancy device to the pipeline near the delivery end thereof.

19. The method of claim 1, comprising pre-installing the anchoring device prior to step (a).

* * * * *